(12) United States Patent
Soeno et al.

(10) Patent No.: US 7,505,220 B2
(45) Date of Patent: *Mar. 17, 2009

(54) MAGNETIC RECORDING MEDIUM, RECORDING/REPRODUCING APPARATUS, AND STAMPER

(75) Inventors: Yoshikazu Soeno, Tokyo (JP); Kazuya Shimakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 347 days.

This patent is subject to a terminal disclaimer.

(21) Appl. No.: 11/358,293

(22) Filed: Feb. 22, 2006

(65) Prior Publication Data

US 2006/0198052 A1 Sep. 7, 2006

(30) Foreign Application Priority Data

Mar. 2, 2005 (JP) ............................. 2005-057291

(51) Int. Cl.
*G11B 5/86* (2006.01)
*G11B 23/02* (2006.01)

(52) U.S. Cl. ...................... 360/16; 360/77.08; 360/135

(58) Field of Classification Search ............... 428/845.6
See application file for complete search history.

(56) References Cited

U.S. PATENT DOCUMENTS

| | | | |
|---|---|---|---|
| 5,772,905 | A | 6/1998 | Chou |
| 6,014,296 | A | 1/2000 | Ichihara et al. |
| 2005/0094298 | A1* | 5/2005 | Sakurai et al. ................ 360/15 |
| 2005/0219730 | A1* | 10/2005 | Sakurai et al. ................ 360/48 |
| 2006/0007573 | A1* | 1/2006 | Tagami ........................ 360/48 |
| 2006/0044687 | A1 | 3/2006 | Soeno et al. |
| 2006/0062135 | A1 | 3/2006 | Soeno et al. |
| 2006/0132953 | A1* | 6/2006 | Asakura et al. ............... 360/48 |

FOREIGN PATENT DOCUMENTS

| | | |
|---|---|---|
| JP | 9-097419 | 4/1997 |
| JP | 11-045528 A | 2/1999 |
| JP | 2000-020945 | 1/2000 |
| JP | 2004-295991 A | 10/2004 |

(Continued)

OTHER PUBLICATIONS

English Language Abstract of JP 9-097419.

(Continued)

*Primary Examiner*—K. Wong
(74) *Attorney, Agent, or Firm*—Greenblum & Bernstein, P.L.C.

(57) ABSTRACT

On a magnetic recording medium, a servo pattern is formed in a servo pattern region on at least one surface of a substrate by a concave/convex pattern including a convex part, at least protruding end part of which is formed of magnetic material, and a concave part. The servo pattern region includes an address pattern region and a burst pattern region, wherein the convex part is formed in the servo pattern region so that a larger of an inscribed circle with a largest diameter out of inscribed circles on an open surface of the concave part formed in the address pattern region and an inscribed circle with a largest diameter out of inscribed circles on an open surface of the concave part formed in the burst pattern region is an inscribed circle with a largest diameter out of inscribed circles on an open surface of the concave part formed in the servo pattern region.

7 Claims, 18 Drawing Sheets

FOREIGN PATENT DOCUMENTS

JP     2005-293730 A    10/2005

OTHER PUBLICATIONS

English Language Abstract of JP 2000-020945.
U.S. Appl. No. 11/229,650 to Soeno et al., filed Sep. 20, 2005.
U.S. Appl. No. 11/265,152 to Soeno et al., filed Nov. 3, 2005.
U.S. Appl. No. 11/345,514 to Soeno et al., filed Feb. 2, 2006.
English language Abstract of JP 2005-293730 A.
English language Abstract of JP 11-045528 A, no date.
English language Abstract of JP 2004-295991 A.

* cited by examiner

F I G. 1
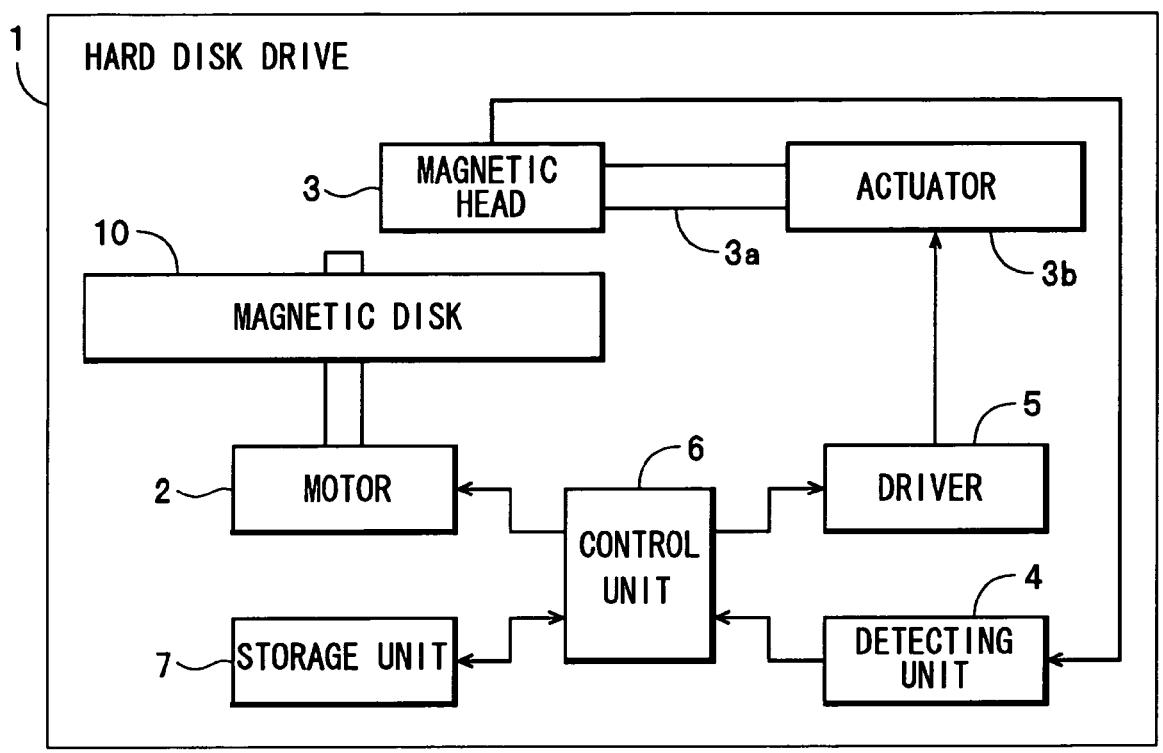

MAGNETIC RECORDING MEDIUM, RECORDING/REPRODUCING APPARATUS, AND STAMPER

BACKGROUND OF THE INVENTION

1. Field of the Invention

The present invention relates to a magnetic recording medium where a servo pattern is formed by a concave/convex pattern in a servo pattern region, a recording/reproducing apparatus equipped with the magnetic recording medium, and a stamper for manufacturing the magnetic recording medium.

2. Description of the Related Art

The specification of U.S. Pat. No. 5,772,905 discloses a nanoimprint lithography method (an imprint method that forms a concave/convex pattern of nanometer size: hereinafter simply "imprint method") that forms a concave/convex pattern of nanometer size on a substrate by pressing a stamper on which a concave/convex pattern of nanometer size is formed into a resin layer on the substrate to transfer the concave/convex pattern of the stamper to the resin layer during a manufacturing process of a semiconductor element, an information recording medium, or the like. In this imprint method, first a stamper ("mold" in U.S. Pat. No. 5,772,905) with a concave/convex pattern of nanometer size (as one example, a minimum lateral size of around 25 nm) formed on a transfer surface thereof is manufactured. More specifically, a desired pattern is drawn on a resin layer formed so as to cover a thin film ("molding layer") of silicon oxide or the like formed on the surface of a silicon substrate using an electron beam lithography device, and then a concave/convex pattern with a plurality of convex parts ("features") is formed in the thickness of the thin film by etching the resin layer using a reactive ion etching device with the thin film as a mask. By doing so, the stamper is manufactured.

Next, as one example, the resin material polymethyl methacrylate (PMMA) is spin-coated onto the surface of a silicon substrate to form a resin layer ("thin film layer") with a thickness of around 55 nm. After this, both the stamper and the multilayer body composed of the substrate and the resin layer are heated and the convex parts of the stamper are pressed into the resin layer on the substrate. When doing so, the resin material at positions where the convex parts of the stamper are pressed in moves into the concave parts of the stamper, resulting in concave parts ("regions") being formed at (i.e., transferred to) the positions where the convex parts are pressed in. Next, after the multilayer body has been allowed to reach room temperature in a state where the stamper is still attached (i.e., after a cooling process has been carried out), the stamper is separated from the resin layer. By doing so, the convex parts in the concave/convex pattern of the stamper are transferred to the resin layer, thereby forming a concave/convex pattern of nanometer size (in the resin layer) on the substrate. After this, by etching the substrate using the resin layer in which the concave/convex pattern is formed as a mask, a plurality of concave parts are formed in the substrate. Accordingly, by forming concave parts in the resin layer on an information recording medium substrate using the technique ("imprint method") described above, it is possible to manufacture an information recording medium with a concave/convex pattern of nanometer size by etching using the resin layer as a mask.

However, by investigating the information recording medium (magnetic recording medium) manufactured according to the conventional imprint method (manufacturing method) described above, the present inventors discovered the following problem. According to the conventional manufacturing method, a concave/convex pattern is formed by producing concave parts in a resin layer formed on a substrate by pressing convex parts of a stamper into the resin layer and then forming a concave/convex pattern in the substrate by etching the substrate using the resin layer in which the concave/convex pattern has been formed as a mask. However, when a discrete track magnetic recording medium is manufactured according to this manufacturing method, the convex parts (of the stamper) are insufficiently pressed into the resin layer. During a process that removes resin material remaining at base parts of the concave parts in the concave/convex pattern formed in (i.e., transferred to) the resin layer, the open surfaces of the concave parts become excessively wide, and therefore it can be difficult to form a concave/convex pattern on a magnetic recording medium with high precision.

A specific example is shown in FIG. 31. A magnetic disk 10z manufactured according to the method of manufacturing described above is manufactured by setting data recording regions Atz, in which data track patterns 40tz respectively composed of a plurality of concentric data recording tracks are formed, and servo pattern regions Asz, in which servo patterns 40sz for tracking servo purposes are formed, so as to alternate in the direction of rotation (the direction of the arrow R in FIG. 31) of the magnetic disk 10z. Here, as shown in FIG. 32, a servo pattern region Asz of the magnetic disk 10z includes for example a preamble pattern region Apz in which a preamble pattern is formed, an address pattern Aaz in which an address pattern is formed, and a burst pattern region Abz where burst patterns are formed in the burst regions Ab1z to Ab4z. Here, non-servo signal regions Axz constructed of concave parts are formed in the respective regions located between a data recording region Atz and the preamble pattern region Apz, between the preamble pattern region Apz and the address pattern region Aaz, between the address pattern region Aaz and the burst pattern region Abz, and between the burst pattern region Abz and the next data recording region Atz. In addition, non-servo signal regions Axbz constructed of concave parts are formed in the regions between the respective burst regions Ab1z to Ab4z in the burst pattern region Abz. Here, control signals for tracking servo control are not recorded in the non-servo signal regions Axz, Axbz and the non-servo signal regions Axz, Axbz are almost entirely constructed of the concave parts described above with no convex parts being present. Note that the obliquely shaded areas in FIG. 32 represent the formation regions of the convex parts in the servo pattern 40sz and the data track pattern 40tz.

Here, various types of concave parts are formed in the data recording regions Atz and the servo pattern regions Asz of the magnetic disk 10z, such as concave parts where the open surface is narrow (for example, concave parts where one of the open length along the direction of rotation of the magnetic disk 10z and the open length along the radial direction of the magnetic disk 10z is short) and concave parts where the open surface is wide (for example, concave parts where both the open length along the direction of rotation and the open length along the radial direction are long). Also, a concave/convex pattern 39z (see FIGS. 33 and 34), where the positional relationship of the convexes and concaves is inversed relative to the concave/convex pattern to be formed on the magnetic disk 10z, is formed on the stamper used to manufacture the magnetic disk 10z. Accordingly, as shown in FIGS. 33 and 34, various types of convex parts 39az such as convex parts with narrow protruding surfaces (the convex parts 39az shown in FIG. 33) and convex parts with wide protruding surfaces (the convex part 39az shown in FIG. 34) are formed on the stamper used to manufacture the magnetic disk 10z. Here, in the conventional manufacturing method, the concave/convex pattern 39z is pressed onto the resin layer with a substantially uniform pressing force across the entire stamper. When doing so, as shown in FIG. 33, at positions where convex parts 39*az* with comparatively narrow protruding surfaces are formed, the resin material at the positions where the convex parts 39*az* are pressed in moves smoothly inside the concave parts 39*bz* of the stamper, which makes it possible to press the convex parts 39*az* sufficiently deeply into the resin layer. As a result, it is possible to form a concave/convex pattern 41z on the substrate where the thickness T1 of the resin layer between the front ends of the convex parts 39*az* and the substrate (i.e., at the base parts of concave parts 41*bz*) is sufficiently thin. It should be noted that in the following description, resin material remaining between base surfaces of concave parts formed in the resin layer and the substrate is referred to as "residue".

On the other hand, as shown in FIG. 34, at positions where a convex part 39*az* with a comparatively wide protruding surface is formed, it is difficult for the resin material at the position where the convex part 39*az* is pressed in to move inside the concave parts 39*bz* of the stamper, which makes it difficult to press the convex part 39*az* sufficiently deeply into the resin layer. As a result, residue with the thickness T2 is produced between the front end of the convex part 39*az* and the substrate (i.e., at the base part of the concave part 41*bz*), resulting in the depth of the concave part 41*bz* becoming shallow. Here, when the substrate is etched with the resin layer in which the concave/convex pattern 41z has been formed as a mask, it is necessary to remove the residue on the base surfaces of such concave parts 41*bz* in the concave/convex pattern 41z by carrying out etching or the like (the removal process mentioned above). Also, as mentioned above, the thickness T1 of the residue at the positions where the convex parts 39*az* with narrow protruding surfaces are pressed in is considerably thinner than the thickness T2 of the residue at the positions where the convex parts 39*az* with wide protruding surfaces are pressed in. Accordingly, when the etching process (removing process) is carried out for a sufficiently long time to reliably remove the residue with the thickness T2, the removal of the residue of the thickness T1 is completed before the removal of the residue of the thickness T2 is completed. As a result, at positions where the residue with the thickness T1 is removed (at positions of the concave parts 41*bz* whose open surfaces are narrow), the inner surfaces of the concave parts 41*bz* are corroded by the etching gas, irradiation of which continues until the residue with the thickness T2 is removed, which makes the concave parts 41*bz* excessively wide. This means that with the magnetic disk 10z manufactured according to the conventional manufacturing method, due to the difficulty in forming the concave parts 41*bz* with the desired width during manufacturing, there is the risk of the concave parts formed in the data recording regions Atz and the servo pattern regions Asz becoming excessively wide, which can result in difficulty in reliably reading magnetic signals.

SUMMARY OF THE INVENTION

The present invention was conceived in view of the problem described above, and it is a principal object of the present invention to provide a magnetic recording medium including servo patterns from which a magnetic signal can be reliably read, a recording/reproducing apparatus, and a stamper that can manufacture such magnetic recording medium.

On a magnetic recording medium according to the present invention, a servo pattern is formed in a servo pattern region on at least one surface of a substrate by a concave/convex pattern including a convex part, at least protruding end part of which is formed of magnetic material, and a concave part, and the servo pattern region includes an address pattern region and a burst pattern region, wherein the convex part is formed in the servo pattern region so that a larger of an inscribed circle with a largest diameter out of inscribed circles on an open surface of the concave part formed in the address pattern region and an inscribed circle with a largest diameter out of inscribed circles on an open surface of the concave part formed in the burst pattern region is an inscribed circle with a largest diameter out of inscribed circles on an open surface of the concave part formed in the servo pattern region. Note that the expression "an open surface of a concave part" in this specification refers to a region between opposite ends of protruding end surfaces of adjacent convex parts that sandwich the concave part, and therefore such an open surface refers to the part of the concave/convex pattern aside from the protruding end surfaces of the convex parts. It is further noted that throughout the specification, "inscribed circles" are also referred to as "virtual inscribed circles."

On the above magnetic recording medium, by forming the convex part in the servo pattern region so that a larger of an inscribed circle with a largest diameter out of inscribed circles on an open surface of the concave part formed in the address pattern region and an inscribed circle with a largest diameter out of inscribed circles on an open surface of the concave part formed in the burst pattern region is an inscribed circle with a largest diameter out of inscribed circles on an open surface of the concave part formed in the servo pattern region, since no concave part with a wide open surface that can have an inscribed circle with a diameter that exceeds the diameter of the larger of the inscribed circles is present inside the servo pattern region, during imprinting to form the concave/convex pattern in the servo pattern region (during a process that transfers the concave/convex pattern of a stamper to a resin layer on a preform for manufacturing a magnetic recording medium), a stamper with a convex part that has an excessively wide protruding end surface is not used and the convex part of the stamper can be smoothly pressed into the resin layer. By doing so, since it is possible to avoid a situation where thick residue is produced on the preform when transferring the concave/convex pattern of the stamper to the resin layer, a situation where the concave part formed in the resin layer becomes excessively wide due to a process that removes the residue is avoided. Accordingly, it is possible to avoid a situation where the concave part formed on the magnetic recording medium is excessively wide. For this reason, it is possible to provide a magnetic recording medium with a servo pattern from which a magnetic signal can be reliably read.

It is also possible to construct the magnetic recording medium such that a plurality of data recording tracks are formed in a data recording region on the at least one surface of the substrate by convex parts, at least protruding end parts of which are formed of the magnetic material, the data recording tracks being formed so that a length along a radial direction of open surfaces of concave parts between adjacent data recording tracks is equal to or smaller than the diameter of the larger of the inscribed circles.

According to the above magnetic recording medium, by forming the data recording tracks in the data recording region so that a length along a radial direction of the concave part between adjacent recording tracks is equal to or smaller than the diameter of the inscribed circle with the largest diameter out of the inscribed circles on the open surface of the concave part formed in the servo pattern region, during imprinting to form the concave/convex pattern in the data recording region (during a process that transfers the concave/convex pattern of a stamper to a resin layer on a preform for manufacturing a magnetic recording medium), a stamper with a convex part that has an excessively wide protruding end surface is not used and the convex part of the stamper can be smoothly pressed into the resin layer. By doing so, it is possible to provide a magnetic recording medium with track patterns onto and from which magnetic signals can be reliably written and read (track patterns for which stabilized recording and reproducing are possible).

A recording/reproducing apparatus according to the present invention includes either of the magnetic recording media described above and a control unit that carries out a tracking servo control process based on a predetermined signal read from the servo pattern region of the magnetic recording medium.

According to the above recording/reproducing apparatus, it is possible to record and reproduce data via a magnetic head that is made on-track to the convex parts (a data recording track) inside the data recording region without being affected by the presence of the concave/convex patterns (dummy patterns) formed in the regions aside from the region in which control signals for tracking servo control are recorded.

On another magnetic recording medium according to the present invention, a servo pattern is formed in a servo pattern region on at least one surface of a substrate by a concave/convex pattern including a convex part, at least protruding end part of which is formed of magnetic material, and a concave part, wherein the servo pattern region includes: a plurality of types of first function regions in which a control signal for tracking servo control is recorded by the concave/convex pattern during manufacturing; and a second function region where a concave/convex pattern of a different type to the concave/convex patterns of the first function regions is formed, wherein an address pattern region and a burst pattern region are included as types in the plurality of types of first function regions, and the convex part is formed in the second function region so that a diameter of an inscribed circle with a largest diameter out of inscribed circles on an open surface of the concave part formed in the second function region is equal to or smaller than a diameter of a larger of an inscribed circle with a largest diameter out of inscribed circles on an open surface of the concave part formed in the address pattern region and an inscribed circle with a largest diameter out of inscribed circles on an open surface of the concave part formed in the burst pattern region.

With the other magnetic recording medium described above, by including a plurality of types of first function regions in which a control signal for tracking servo control is recorded by a concave/convex pattern during manufacturing and a second function region where a concave/convex pattern of a different type to the concave/convex patterns of the first function regions is formed, and forming a convex part in the second function region so that a diameter of an inscribed circle with a largest diameter out of inscribed circles on an open surface of the concave part formed in the second function region is equal to or smaller than a diameter of a larger of an inscribed circle with a largest diameter out of inscribed circles on an open surface of the concave part formed in the address pattern region and an inscribed circle with a largest diameter out of inscribed circles on an open surface of the concave part formed in the burst pattern region, unlike the conventional magnetic disk 10z where the entire region of the non-servo signal regions Axz, Axbz are composed of concave parts, it is possible to smoothly press the convex part of the stamper into the resin layer without using a stamper with a convex part whose protruding end surface is excessively wide (convex part with a protruding end surface whose width is equal to the entire width of the second function region). By doing so, since it is possible to avoid a situation where thick residue is produced in the second function region during manufacturing and prevent the concave part from widening due to a process that removes the residue, it is possible to provide a magnetic disk with servo patterns from which a magnetic signal can be reliably read.

Also, a recording/reproducing apparatus according to the present invention includes the other magnetic recording medium described above and a control unit that carries out a tracking servo control process based on a predetermined signal read from the first function regions of the magnetic recording medium.

According to the above recording/reproducing apparatus, it is possible to record and reproduce data via a magnetic head that is made on-track to the convex parts (a data recording track) inside the data recording region without being affected by the presence of the concave/convex patterns (dummy patterns) formed in the second function region.

A stamper according to the present invention is used for manufacturing a magnetic recording medium, and on such stamper is formed a concave/convex pattern including a convex part formed corresponding to the concave part in the concave/convex pattern of either of the magnetic recording media described above and a concave part formed corresponding to the convex part in the concave/convex pattern of the magnetic recording medium.

On the above stamper, by forming a concave/convex pattern including a convex part formed corresponding to the concave part in the concave/convex pattern on either of the magnetic recording media described above and a concave part formed corresponding to the convex part in the concave/convex pattern of the magnetic recording medium, when carrying out imprinting on a preform for manufacturing a magnetic recording medium, since there is no convex part with a wide protruding end surface (for example, a convex part where both the length along the direction of rotation and the length along the radial direction are excessively long) on the stamper, the concave/convex pattern (the convex part) of the stamper can be smoothly pressed into the preform. Accordingly, it is possible to avoid a situation where problems occur due to the convex part being insufficiently pressed in (a situation where the concave part becomes excessively wide due to thick residue being produced on the preform). By doing so, it is possible to manufacture a magnetic recording medium from which servo data can be read reliably.

It should be noted that the disclosure of the present invention relates to a content of Japanese Patent Application 2005-057291 that was filed on 2, Mar. 2005 and the entire content of which is herein incorporated by reference.

BRIEF DESCRIPTION OF THE DRAWINGS

These and other objects and features of the present invention will be explained in more detail below with reference to the attached drawings, wherein:

FIG. 1 is a diagram showing the construction of a hard disk drive;

DESCRIPTION OF THE PREFERRED EMBODIMENTS

Figure 2:
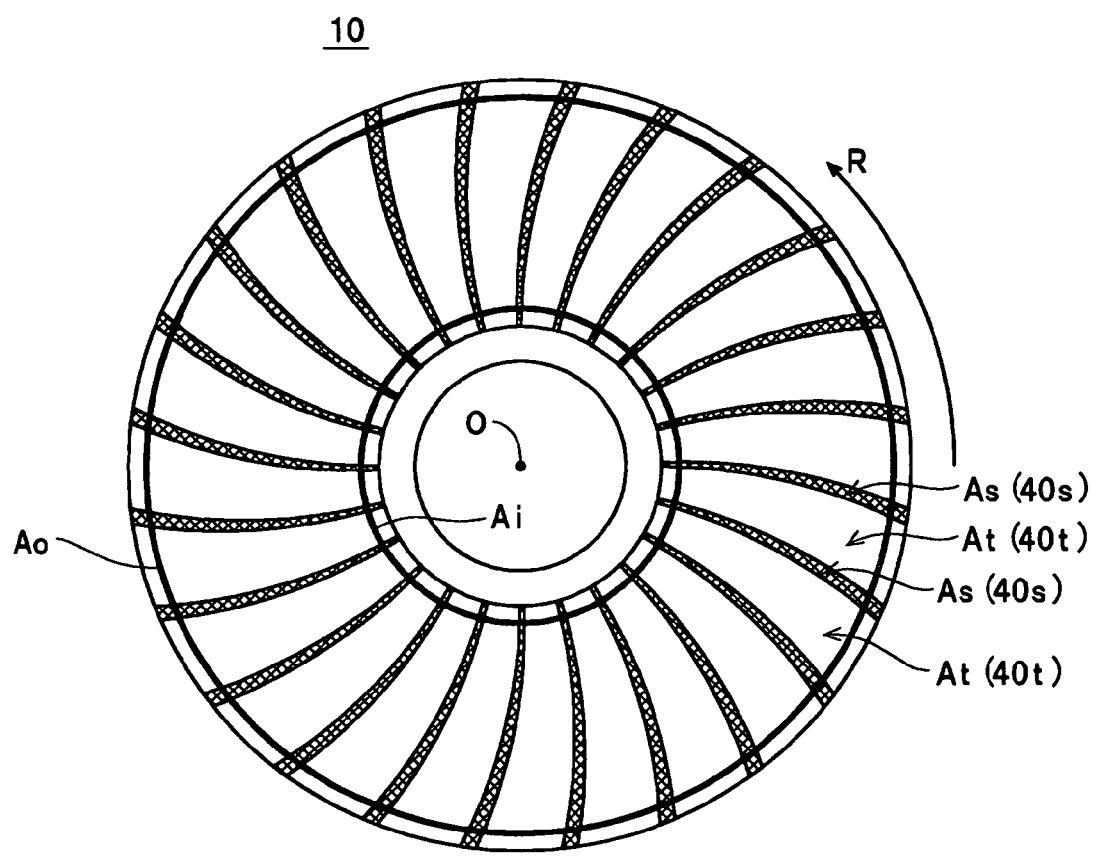
FIG. 2 is a plan view of a magnetic disk shown in FIG. 1.

Preferred embodiments of a magnetic recording medium, a recording/reproducing apparatus, and a stamper according to the present invention will now be described with reference to the attached drawings.

A hard disk drive 1 shown in FIG. 1 is one example of a recording/reproducing apparatus according to the present invention and includes a motor 2, a magnetic head 3, a detecting unit 4, a driver 5, a control unit 6, a storage unit 7, and a magnetic disk 10 so as to be capable of recording and reproducing various kinds of data. According to control by the control unit 6, the motor 2 rotates the magnetic disk 10 at a fixed speed, for example, 4200 rpm. The magnetic head 3 is attached to an actuator 3b via a swing arm 3a and is caused to move above the magnetic disk 10 by the actuator 3b during the recording and reproducing of data on the magnetic disk 10. Also, the magnetic head 3 carries out the reading of servo data from a servo pattern region As of the magnetic disk 10 (see FIG. 2), the magnetic writing of data in a data recording region At (see FIG. 2), and the reading of recording data that has been magnetically written in the data recording region At. Note that although the magnetic head 3 is actually formed on a base surface (air bearing surface) of a slider to cause the magnetic head 3 to fly above the magnetic disk 10, the slider has been omitted from the description and the drawings. By swinging the swing arm 3a using a driving current supplied from the driver 5 under the control of the control unit 6, the actuator 3b moves the magnetic head 3 to an arbitrary recording/reproducing position on the magnetic disk 10.

The detecting unit 4 obtains (detects) servo data from an output signal (analog signal) outputted from the magnetic head 3 and outputs the servo data to the control unit 6. The driver 5 controls the actuator 3b in accordance with a control signal outputted from the control unit 6 to make the magnetic head 3 on-track to a desired data recording track. The control unit 6 carries out overall control over the hard disk drive 1. The control unit 6 is one example of a "control unit" for the present invention and controls the driver 5 (i.e., executes a tracking servo control process) based on the servo data (one example of a "predetermined signal read from the servo pattern region") outputted from the detecting unit 4. The storage unit 7 stores an operation program of the control unit 6 and the like.

Figure 4:
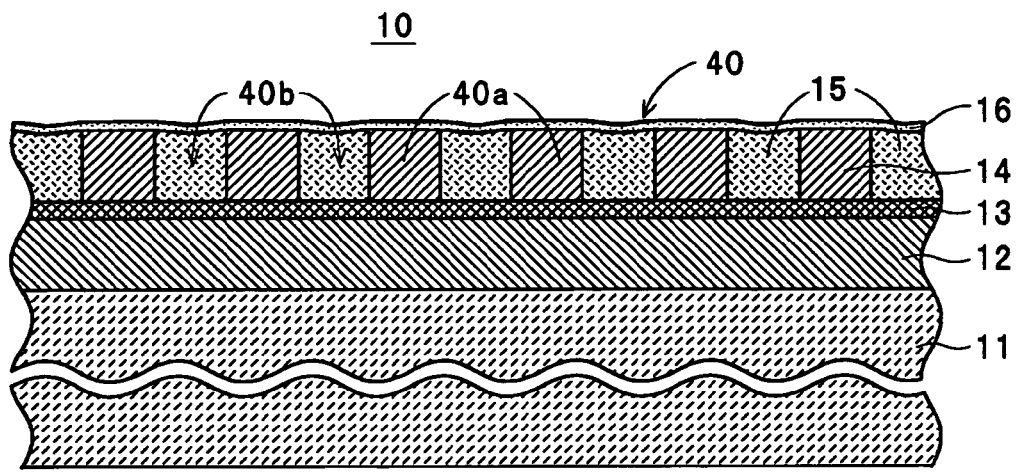
FIG. 4 is a cross-sectional view showing the layer construction of the magnetic disk shown in FIG. 1.

On the other hand, the magnetic disk 10 is one example of the magnetic recording medium according to the present invention, and is installed inside a case of the hard disk drive 1 together with the motor 2, the magnetic head 3, and the like described above. The magnetic disk 10 is a discrete track-type magnetic disk (a patterned medium) on which data can be recorded using a perpendicular recording method, and as shown in FIG. 4, a soft magnetic layer 12, an intermediate layer 13, and a magnetic layer 14 are formed in the mentioned order on a glass substrate 11. Here, the magnetic layer 14 constructs a concave/convex pattern 40 in which are formed convex parts 40a, which are entirely formed of magnetic material from protruding end parts (the upper end parts in FIG. 4) thereof to base end parts (the lower end parts in FIG. 4), and concave parts 40b located between the convex parts 40a. Also, the concave parts 40b are filled with non-magnetic material 15 such as $SiO_2$ to smooth the surface of the magnetic disk 10. In addition, a protective layer 16 (a DLC film) with a thickness of around 2 nm is formed using diamond-like carbon (DLC) on the surfaces of the non-magnetic material 15 filled in the concave parts 40b and the magnetic layer 14 (the convex parts 40a). A lubricant (as one example, a Fomblin lubricant) is also applied onto the surface of the protective layer 16 of the magnetic disk 10a to prevent damage to both the magnetic head 3 and the magnetic disk 10.

The glass substrate 11 corresponds to a "substrate" for the present invention and is formed in a disk-like shape with a thickness of around 0.6 mm by polishing the surface of a glass plate. Note that the substrate for the present invention is not limited to a glass substrate and it is possible to use a substrate formed in a disk-like shape using various types of non-magnetic material such as aluminum and ceramics. The soft magnetic layer 12 is formed as a thin film with a thickness of around 100 nm to 200 nm by sputtering a soft magnetic material such as CoZrNb alloy. The intermediate layer 13 functions as an underlayer for forming the magnetic layer 14 and is formed as a thin film with a thickness of around 40 nm by sputtering an intermediate layer forming material such as Cr or a non-magnetic CoCr alloy. The magnetic layer 14 is a layer that constructs the concave/convex pattern 40 (the data track patterns 40t and the servo patterns 40s shown in FIG. 3) and as described later, the concave parts 40b are formed by etching a layer produced by sputtering CoCrPt alloy, for example.

Here, as shown in FIG. 2, on the magnetic disk 10, the servo pattern regions As are provided between the data recording regions At and are set so that the data recording region At and the servo pattern region As are alternately disposed in the direction of rotation of the magnetic disk 10 (i.e., the direction of the arrow R). Note that in the present specification, each region sandwiched by two data recording regions At disposed in the direction of rotation (each region from a trailing end in the direction of rotation of a data recording region At to a leading end in the direction of rotation of another data recording region At) is regarded as a servo pattern region As. Also, the ends in the direction of rotation of the data recording regions At are set as coinciding with virtual segments (straight or arc-like segments along the radial direction of the magnetic disk 10) that join the respective ends in the direction of rotation of a plurality of data recording tracks (the convex parts 40a described later) formed in the data recording region At.

The hard disk drive 1 equipped with the magnetic disk 10 is constructed so that the magnetic disk 10 is rotated at a fixed angular speed by the motor 2 in accordance with control by the control unit 6 as described above. Accordingly, on the magnetic disk 10, the length of each data recording region At along the direction of rotation of the magnetic disk 10 and the length of each servo pattern region As along the direction of rotation are set so as to increase as the distance from the center O of the data track patterns 40t increases in proportion to the length of a part of the magnetic disk 10 that passes below the magnetic head 3 per unit time (i.e., the data recording regions At and the servo pattern regions As are set so as to widen from an inner periphery region Ai toward an outer periphery region Ao). As a result, the length along the direction of rotation of the protruding end surfaces of the data recording tracks (the convex parts 40a) formed inside the data recording regions At, and the standard lengths (lengths corresponding to standard signal lengths, for example) along the direction of rotation of the protruding end surfaces of the convex parts 40a of the servo pattern 40s formed inside the servo pattern regions As and the open surfaces of the concave parts 40b (an "open surface" being a region between opposite ends of protruding end surfaces of adjacent convex parts 40a that sandwich a concave part 40b) are set so as to increase from the inner periphery region Ai toward the outer periphery region Ao of the magnetic disk 10. Note that in the following description, the length along the direction of rotation of open surfaces of the concave parts 40b is also referred to as the "length along the direction of rotation of the concave parts 40b". The length along the radial direction of the magnetic disk 10 of the open surfaces of the concave parts 40b is also referred to as "the length along the radial direction of the concave parts 40b".

Note that the standard length along the direction of rotation of the protruding end surfaces of the convex parts 40a inside the servo pattern regions As and the standard length along the direction of rotation of the concave parts 40b are set at substantially equal lengths inside regions of several tens of tracks that are adjacent in the radial direction of the magnetic disk 10. For this reason, in the present specification, the case where the standard length along the direction of rotation is equal in such regions of several tens of tracks is described. More specifically, as examples, the standard lengths along the direction of rotation are equal inside regions of several tens of tracks included in the inner periphery region Ai and the standard lengths along the direction of rotation are equal inside regions of several tens of tracks included in the outer periphery region Ao. Also, if not specifically stated otherwise when describing the length along the direction of rotation of the protruding end surfaces of the convex parts 40a and the length along the direction of rotation of the concave parts 40b formed in the servo pattern regions As, corresponding lengths at positions with an equal radius (inside regions with an equal radius) where the distance from the center O of the data track patterns 40t is equal are described as standards.

Figure 3:
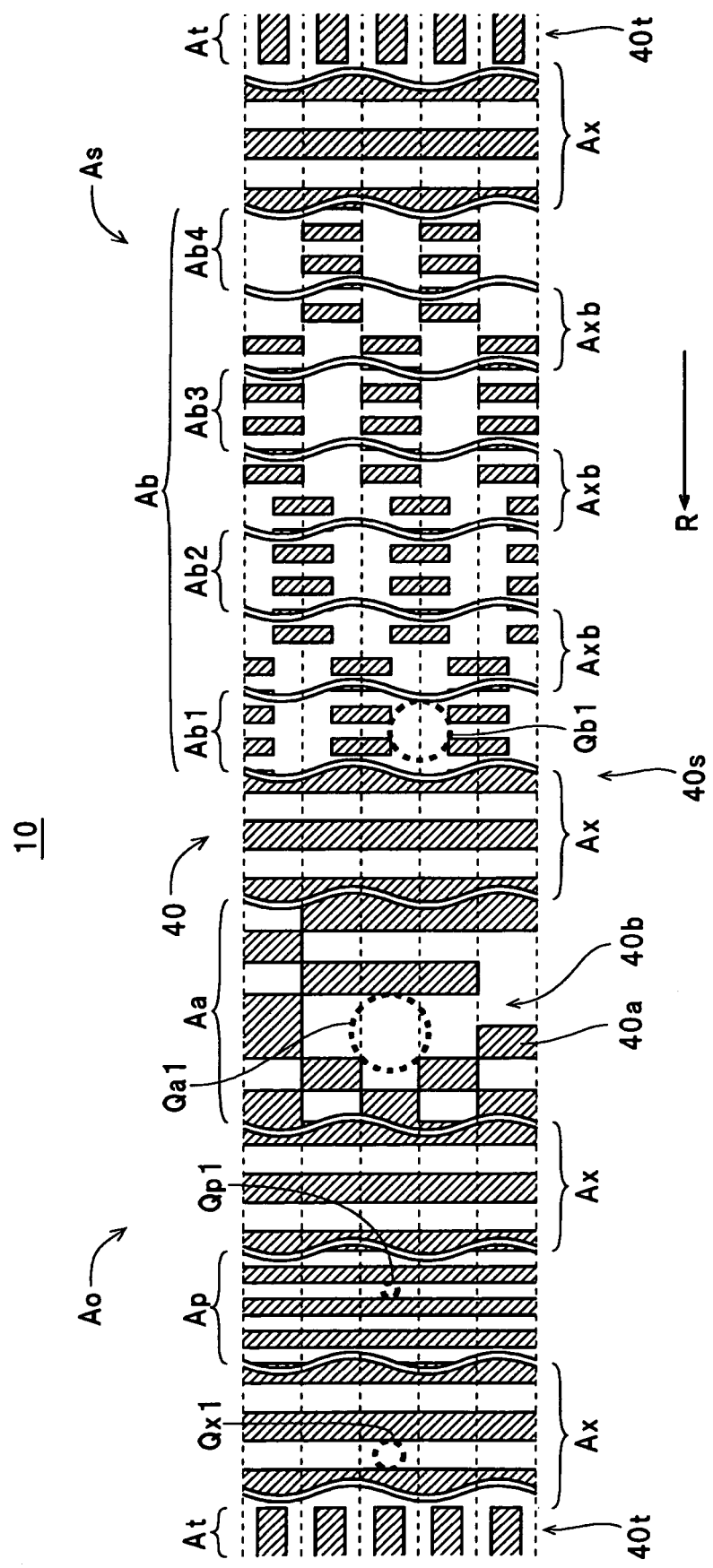
FIG. 3 is a plan view of principal parts of the magnetic disk shown in FIG. 2 showing examples of various patterns formed in a data recording region and a servo pattern region in an outer periphery region.
Figure 5:
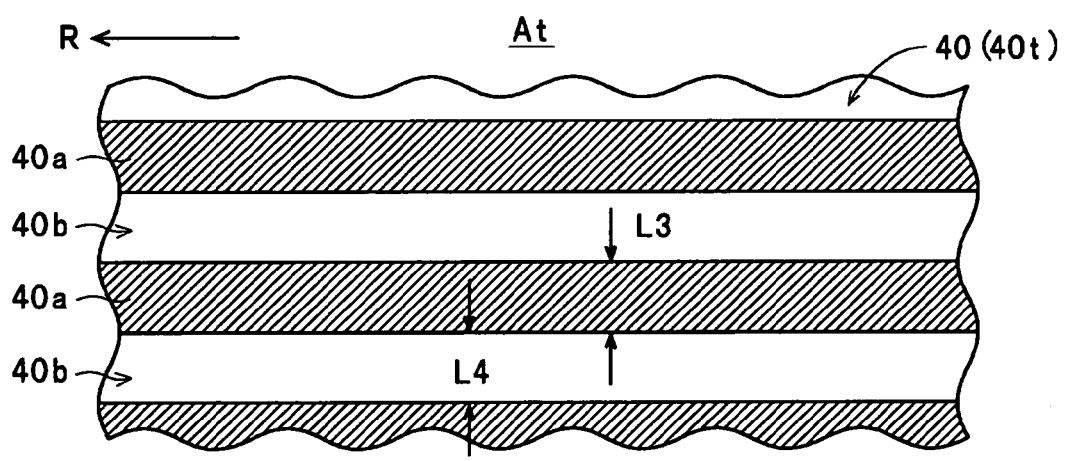
FIG. 5 is a plan view of a data recording region showing one example of a data track pattern formed in the data recording region shown in FIG. 3.

Also, as shown in FIG. 3, a data track pattern 40t is formed in each data recording region At. Note that the obliquely shaded regions in FIG. 3 and FIGS. 5 to 11, and 26 to 28 described later show formation regions of the convex parts 40a in the concave/convex patterns 40. Here, as shown in FIG. 5, the data track patterns 40t are composed of a large number of convex parts 40a (data recording tracks) that are concentric with the center O (see FIG. 2), and the concave parts 40b present between the respective convex parts 40a ("inter-track concave parts"). Note that although it is preferable for the center of rotation of the magnetic disk 10 and the center O of the data track patterns 40t to match, there is the risk of a minute displacement of around 30 to 50 μm being caused between the center of rotation of the magnetic disk 10 and the center O of the data track patterns 40t due to manufacturing error. However, since tracking servo control can still be performed sufficiently for the magnetic head 3 when a displacement of such magnitude is present, the center of rotation and the center O can be thought of as effectively matching.

Also, as shown in FIG. 5, in each data recording region At of the magnetic disk 10, as one example the length L3 of the protruding end surfaces of the convex parts 40*a*(the data recording tracks) along the radial direction of the magnetic disk 10 is equal to the length L4 ("open lengths") of the concave parts 40*b* ("inter-track concave parts") along the radial direction of the magnetic disk 10. That is, the ratio of the lengths is 1:1. In addition, on the magnetic disk 10, the length L3 along the radial direction of the magnetic disk 10 of the convex parts 40*a* formed in the data recording regions At and the length L4 along the radial direction of the concave parts 40*b* are set equal from the inner periphery region Ai to the outer periphery region Ao. Also, the concave parts 40*b* of the data track patterns 40*t* are filled with the non-magnetic material 15 to smooth the surface of the data recording regions At.

On the other hand, as shown in FIG. 3, a servo pattern 40*s*, which includes a preamble pattern formed in a preamble pattern region Ap, an address pattern formed in an address pattern region Aa, burst patterns formed in the burst pattern region Ab, and dummy patterns formed in non-servo signal regions Ax, is formed in each servo pattern region As. Here, the preamble pattern region Ap, the address pattern region Aa, and the burst pattern region Ab correspond to "first function regions" for the present invention, and the servo pattern 40*s* formed in such regions is a pattern corresponding to "a control signal for tracking servo control" for the present invention. Also, out of the servo patterns 40*s*, in the preamble pattern, the address pattern, and the burst patterns (that is, the patterns aside from the dummy patterns), the formation positions and sizes (lengths along the direction of rotation of the magnetic disk 10 and the like) of the convex parts 40*a* and concave parts 40*b* are set corresponding to "control signals for tracking servo control" for the present invention.

Figure 6:
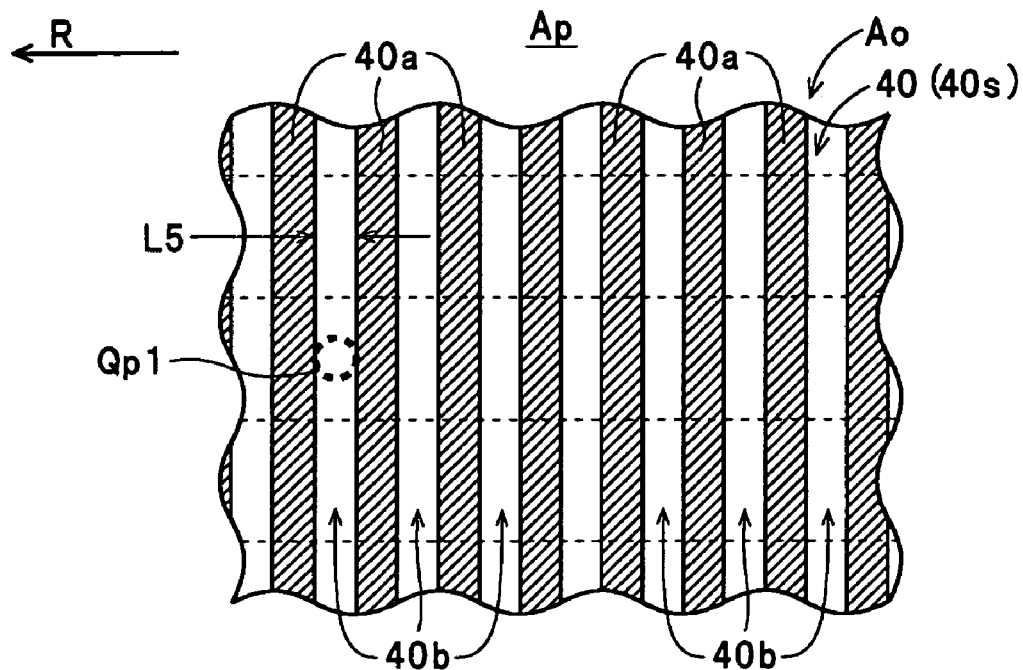
FIG. 6 is a plan view of a preamble pattern region showing one example of a preamble pattern formed in the preamble pattern region shown in FIG. 3.

More specifically, the preamble pattern formed in the preamble pattern region Ap is a servo pattern for correcting a standard clock for reading various types of control signal from the address pattern region Aa and the like in accordance with the rotational state (rotation speed) of the magnetic disk 10, and as shown in FIG. 6, belt-shaped convex parts 40*a* that extend in the radial direction (the up-down direction in FIG. 6) of the magnetic disk 10 are formed along the direction of rotation (the direction of the arrow R) of the magnetic disk 10 with concave parts 40*b* in between. Here, the lengths L5 along the direction of rotation of the concave parts 40*b* and the lengths along the direction of rotation of the protruding end surfaces of the convex parts 40*a* formed in the preamble pattern region Ap are set equal at positions with the same radius where the distance from the center O is the same and so as to increase from the inner periphery region Ai toward the outer periphery region Ao.

Here, as one example, the lengths L5 along the direction of rotation of the open surfaces of the concave parts 40*b* formed in the preamble pattern regions Ap in the outer periphery region Ao are set at one half of the length L4 along the radial direction of the open surfaces of the concave parts 40*b* (inter-track concave parts) formed in the data recording regions At. Note that the lengths along the direction of rotation of the convex parts 40*a* and the concave parts 40*b* in the preamble pattern are not limited to the example described above and the length of the convex parts 40*a* and the length of the concave parts 40*b* can be set at respectively different lengths. Also, since the lengths along the direction of rotation of the concave parts 40*b* formed in the preamble pattern regions Ap are equal at positions with the same radius, the diameters of inscribed circles that contact (two-point contact) both ends in the direction of rotation of open surfaces of concave parts 40*b* are equal at positions with the same radius. In addition, on the magnetic disk 10, out of the inscribed circles on the open surfaces of the concave parts 40*b* formed in the preamble pattern regions Ap across the entire region from the inner periphery region Ai to the outer periphery region Ao, a diameter L5 of the inscribed circles Qp1 on the open surfaces of the concave parts 40*b* formed in the outer periphery region Ao is the largest diameter. Note that in the following explanation, inscribed circles on the open surfaces of the concave parts 40*b* are also called "inscribed circles of the concave parts 40*b*".

Figure 7:
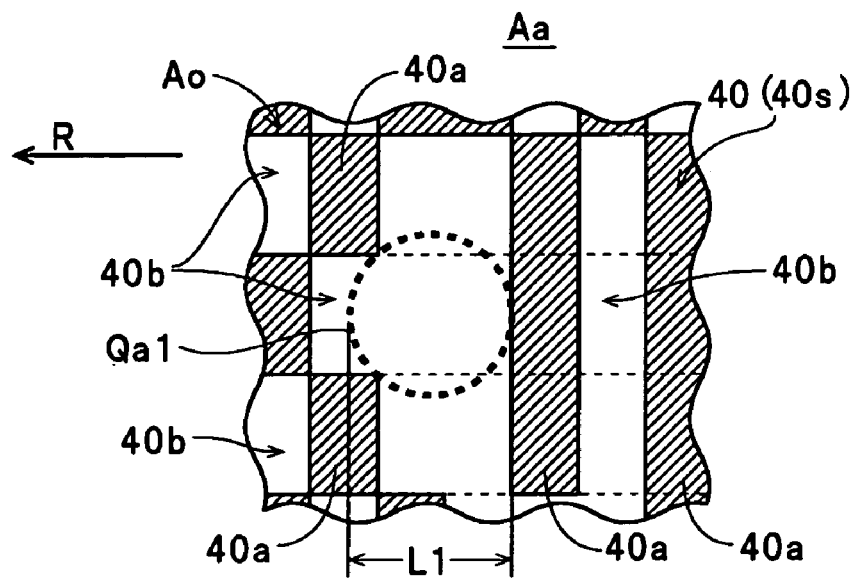
FIG. 7 is a plan view of an address pattern region showing one example of an address pattern formed in the address pattern region shown in FIG. 3.

Also, the address pattern formed in each address pattern region Aa is a servo pattern formed corresponding to the address data and the like showing the track number and the like of the track to which the magnetic head 3 is being made on-track, and as shown in FIG. 7, the lengths of the protruding end surfaces of the convex parts 40*a* along the direction of rotation and the lengths of the concave parts 40*b* along the direction of rotation are set corresponding to such address data. Here, as one example, the minimum length out of the lengths along the radial direction of the concave parts 40*b* formed in the address pattern region Aa is set so as to be equal to the sum of the length L3 along the radial direction of the protruding end surfaces of the convex parts 40*a* and the length L4 along the radial direction of the concave parts 40*b* in the data track pattern 40*t* (i.e., equal to the track pitch). Also, on the magnetic disk 10, the convex parts 40*a* are formed inside each servo pattern region As so that the inscribed circle Qa1 with the largest diameter (the inscribed circle with the diameter L1 shown in FIG. 7) out of the inscribed circles of the concave parts 40*b* formed in the address pattern region Aa is the inscribed circle with the largest diameter out of the inscribed circles of all of the concave parts 40*b* inside the servo pattern region As.

Figure 8:
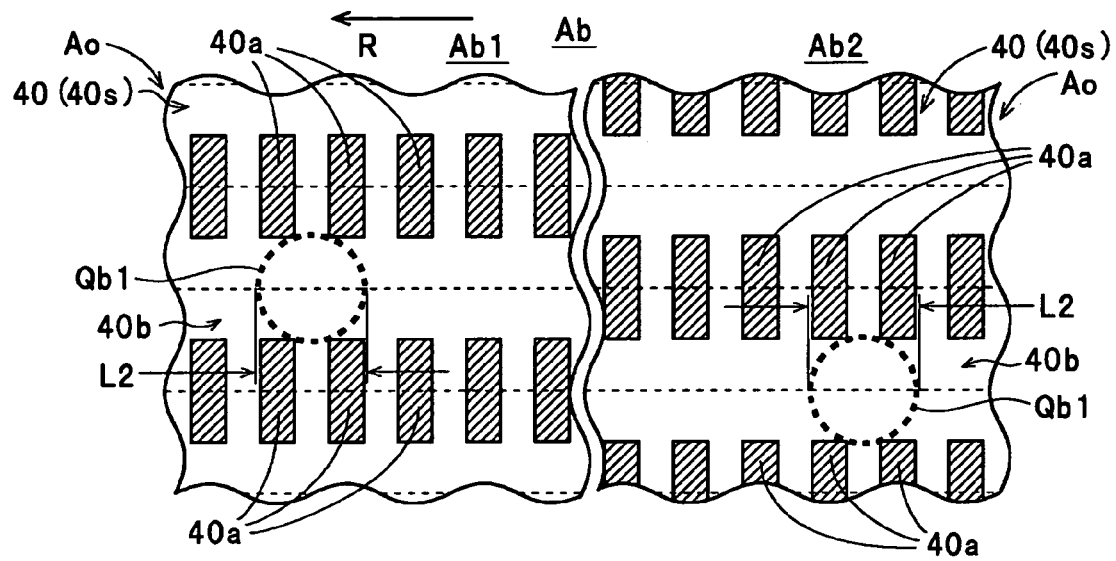
FIG. 8 is a plan view of a burst pattern region showing one example of burst patterns formed in a first burst region and a second burst region shown in FIG. 3.
Figure 9:
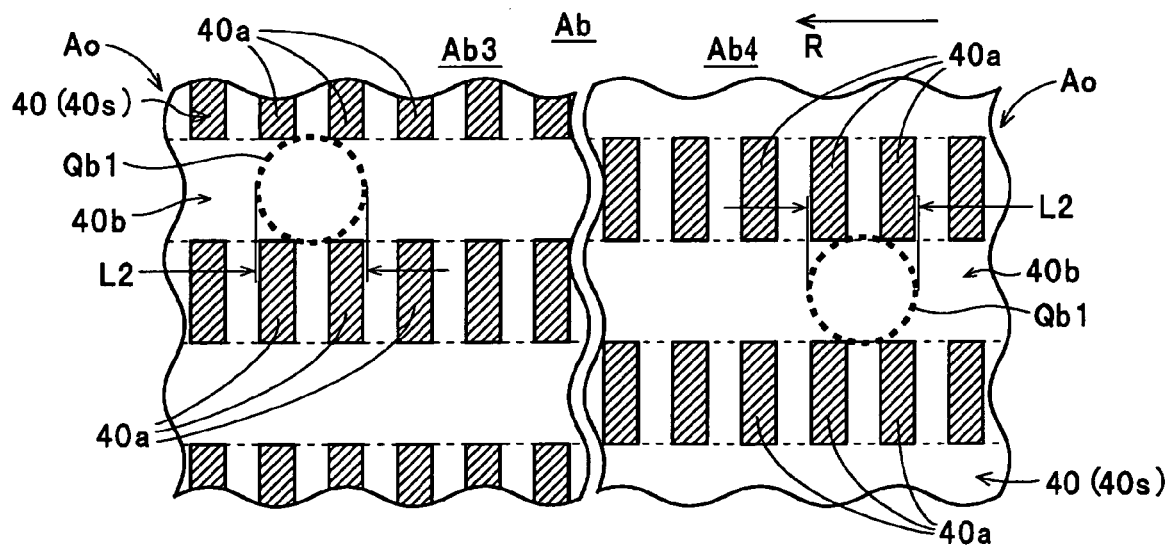
FIG. 9 is a plan view of a burst pattern region showing one example of burst patterns formed in a third burst region and a fourth burst region shown in FIG. 3.

Also, as shown in FIG. 3, each burst pattern region Ab includes first to fourth burst pattern regions Ab1 to Ab4 and the non-servo signal regions Axb. In this case, the burst patterns formed in the first to fourth burst regions Ab1 to Ab4 are servo patterns for detecting positions in order to make the magnetic head 3 on-track to a desired track, and as shown in FIGS. 8 and 9, by forming a plurality of convex parts 40*a* along the direction of rotation of the magnetic disk 10, regions where the convex parts 40*a* and the concave parts 40*b* are alternately disposed in the direction of rotation and regions where the concave parts 40*b* are continuous in the direction of rotation are formed.

Here, as one example, the lengths along the direction of rotation of the concave parts 40*b* between convex parts 40*a* aligned along the direction of rotation in the first to fourth burst regions Ab1 to Ab4 in each burst pattern region Ab are set equal to the lengths along the direction of rotation of the concave parts 40*b* formed in the preamble pattern regions Ap at positions with the same radius. Also, as one example, the lengths along the direction of rotation of the protruding end surfaces of the convex parts 40*a* formed in each burst pattern region Ab are set equal to the lengths along the direction of rotation of the protruding end surfaces of the convex parts 40*a* formed in the preamble pattern region Ap at positions with the same radius. Also, the minimum length along the radial direction of the concave parts 40*b* between the convex parts 40*a* aligned along the radial direction in the first to fourth burst regions Ab1 to Ab4 in each burst pattern region Ab is set equal to the minimum length along the radial direction of the concave parts 40*b* formed in the address pattern region Aa and therefore equal to the sum of the length L3 along the radial direction of the convex parts 40*a* and the length L4 along the radial direction of the concave parts 40*b* formed in the data track patterns 40*t* (i.e., equal to the track pitch).

Also, as shown in FIG. 3, the rows of convex parts 40*a* formed in each burst pattern region Ab (the rows aligned in the direction of rotation) are displaced by one track pitch in the radial direction between the first burst region Ab1 and the second burst region Ab2 and by one track pitch in the radial direction between the third burst region Ab3 and the fourth burst region Ab4. In addition, a burst pattern composed of a pair of the concave/convex pattern 40 inside the first burst region Ab1 and the concave/convex pattern 40 inside the second burst region Ab2 and a burst pattern composed of a pair of the concave/convex pattern 40 inside the third burst region Ab3 and the concave/convex pattern 40 inside the fourth burst region Ab4 are respectively displaced by half a track pitch in the radial direction. Here, as shown in FIGS. 8 and 9, the inscribed circle Qb1 with the largest diameter out of the inscribed circles of the concave parts 40*b* formed inside the first to fourth burst regions Ab1 to Ab4 in each burst pattern region Ab contacts (four-point contact) four convex parts 40*a* in the rows of convex parts 40*a* aligned along the direction of rotation of the magnetic disk 10. Note that the diameter L2 of the inscribed circle Qb1 is smaller than the diameter L1 of the inscribed circle Qa1 inside the address pattern region Aa described above.

Figure 10:
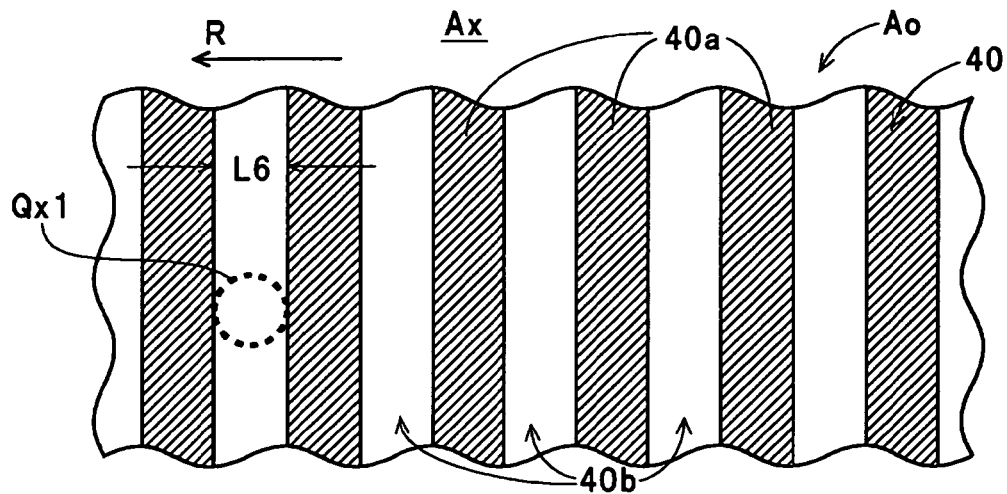
FIG. 10 is a plan view of a non-servo signal region showing one example of a concave/convex pattern formed in a non-servo signal region shown in FIG. 3.

In addition, as shown in FIG. 3, the non-servo signal regions Ax that are one example of "second function regions" for the present invention are formed between one data recording region At and the preamble pattern region Ap, between the preamble pattern region Ap and the address pattern region Aa, between the address pattern region Aa and the burst pattern region Ab, and between the burst pattern region Ab and another data recording region At. In such non-servo signal regions Ax, patterns (examples of "concave/convex patterns of a different type to the concave/convex patterns of the first function regions" for the present invention) of a different type to the various patterns formed in the preamble pattern region Ap, the address pattern region Aa, and the burst pattern region Ab (the first to fourth burst regions Ab1 to Ab4) described above are formed. More specifically, as shown in FIG. 10, in the non-servo signal regions Ax, belt-shaped convex parts 40*a* that extend in the radial direction of the magnetic disk 10 (the up-down direction in FIG. 10) are formed with concave parts 40*b* in between along the direction of rotation of the magnetic disk 10 (the direction of the arrow R).

Here, as one example, the length along the direction of rotation of the protruding end surfaces of the convex parts 40*a* formed in the non-servo signal regions Ax and the length along the direction of rotation of the concave parts 40*b* are set respectively equal for positions with an equal radius where the distance from the center O is equal and so as to increase from the inner periphery region Ai toward the outer periphery region Ao. Accordingly, inscribed circles that contact (two-point contact) both ends in the direction of rotation of the open surfaces of the concave parts 40*b* formed in the non-servo signal regions Ax have the same diameter at positions with the same radius and an inscribed circle Qx1 (diameter L6) on an open surface of a concave part 40*b* in the outer periphery region Ao is the inscribed circle with the largest diameter out of the inscribed circles of the concave parts 40*b* inside the non-servo signal regions Ax. Also, on the magnetic disk 10, the length along the direction of rotation of the protruding end surfaces of the convex parts 40*a* and the length along the direction of rotation of the concave parts 40*b* formed in the outer periphery region Ao of the non-servo signal regions Ax are set equal to the length L3 of the protruding end surfaces of the convex parts 40*a* and the length L4 of the concave parts 40*b* in the data recording regions At. Note that the lengths along the direction of rotation of the convex parts 40*a* and the concave parts 40*b* in the non-servo signal regions Ax are not limited to the example described above, and the length of the convex parts 40*a* and the length of the concave parts 40*b* can be set at respectively different lengths. Also, the lengths can be set at different lengths to the length L3 of the convex parts 40*a* and the length L4 of the concave parts 40*b* formed in the data recording regions At.

The concave/convex pattern 40 formed in the non-servo signal regions Ax is a dummy pattern formed so that the convex parts 39*a* of the stamper 30 (see FIG. 13) can be smoothly pressed into the resin layer 18 during manufacturing, and although the reading of a magnetic signal by the magnetic head 3 and the detection process for the servo data carried out by the detecting unit 4 are performed during the recording and reproducing of data on the magnetic disk 10, data corresponding to the concave/convex patterns 40 formed in the non-servo signal regions Ax is distinguished by the control unit 6 as different data to the servo data for a tracking servo. Accordingly, the lengths of the convex parts 40*a* and the concave parts 40*b* formed inside the non-servo signal regions Ax are not affected by the lengths of the other patterns and can be freely set within a range where no problems occur in the imprint process during manufacturing. The shapes of the convex parts 40*a* and the concave parts 40*b* can also be set freely.

Figure 11:
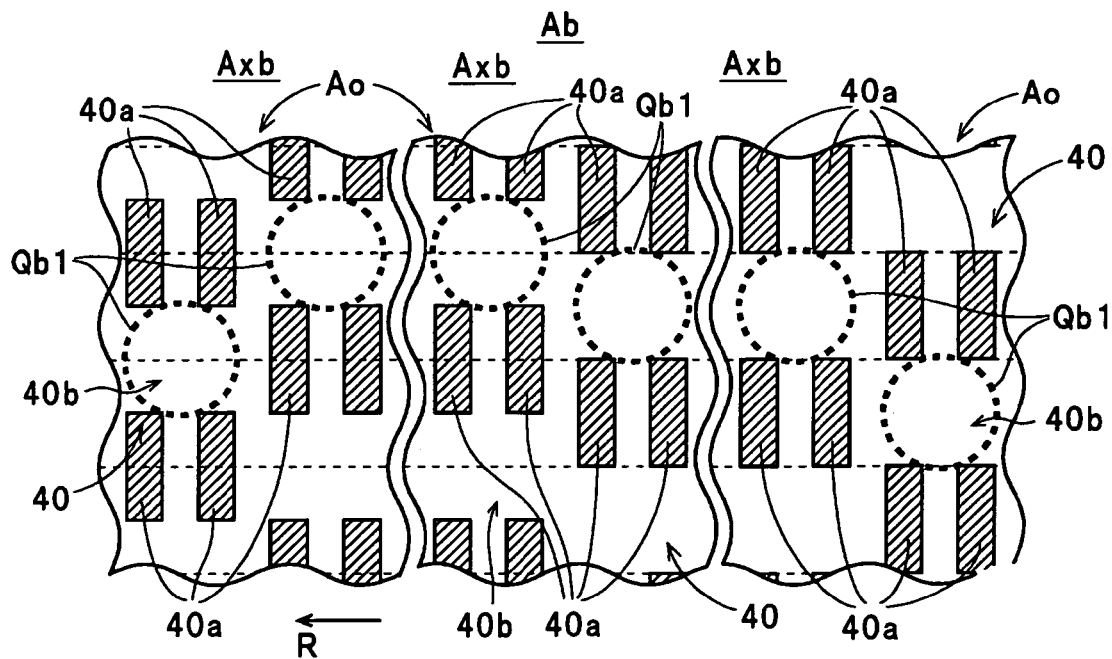
FIG. 11 is a plan view of a non-servo signal region showing one example of a concave/convex pattern formed in a non-servo signal region shown in FIG. 3.

In addition, as shown in FIG. 3, the non-servo signal regions Axb are respectively formed between the first burst region Ab1 and the second burst region Ab2, between the second burst region Ab2 and the third burst region Ab3, and between the third burst region Ab3 and the fourth burst region Ab4 in the burst pattern region Ab. In the same way as the non-servo signal regions Ax described above, the non-servo signal regions Axb are regions in which dummy patterns for enabling the convex parts 39*a* of the stamper 30 (see FIG. 13) to be smoothly pressed into the resin layer 18 during manufacturing are formed, and as shown in FIG. 11, similar patterns (the same shapes) to the burst patterns formed in the respective regions from the first burst region Ab1 to the fourth burst region Ab4 are formed as dummy patterns. More specifically, in the non-servo signal region Axb between the first burst region Ab1 and the second burst region Ab2 (the non-servo signal region Axb on the left side in FIG. 11), the same type of burst pattern (the convex parts 40*a* and the concave parts 40*b*) as the first burst region Ab1 is formed on the first burst region Ab1 side of the non-servo signal region Axb in the direction of rotation, and the same type of burst pattern (the convex parts 40*a* and the concave parts 40*b*) as the second burst region Ab2 is formed on the second burst region Ab2 side of the non-servo signal region Axb in the direction of rotation.

In the same way, in the non-servo signal region Axb between the second burst region Ab2 and the third burst region Ab3 (the non-servo signal region Axb in the center in FIG. 11), the same type of burst pattern as the second burst region Ab2 is formed on the second burst region Ab2 side in the direction of rotation, and the same type of burst pattern as the third burst region Ab3 is formed on the third burst region Ab3 side in the direction of rotation. Also, in the non-servo signal region Axb between the third burst region Ab3 and the fourth burst region Ab4 (the non-servo signal region Axb on the right side in FIG. 11), the same type of burst pattern as the third burst region Ab3 is formed on the third burst region Ab3 side in the direction of rotation, and the same type of burst pattern as the fourth burst region Ab4 is formed on the fourth burst region Ab4 side in the direction of rotation. Accordingly, in the burst pattern region Ab, the first to fourth burst regions Ab1 to Ab4 appear to be continuous with no non-servo signal regions Axb being present. However, although magnetic signals are read by the magnetic head 3 from the non-servo signal region Axb during the recording and reproducing of data on the magnetic disk 10, the control unit 6 distinguishes the data corresponding to the concave/convex pattern 40 formed in the non-servo signal region Axb as different data to the servo data for a tracking servo.

Here, as shown in FIG. 11, in the same way as the inscribed circle Qb1 with the largest diameter out of the inscribed circles of the concave parts 40b formed inside the first to fourth burst regions Ab1 to Ab4, the inscribed circle Qb1 with the largest diameter out of the inscribed circles of the concave parts 40b formed inside the non-servo signal region Axb contacts (four-point contact) four convex parts 40a in the rows of convex parts 40a aligned along the direction of rotation. The diameter L2 of the inscribed circle Qb1 is also smaller than the diameter L1 of the inscribed circle Qa1 inside the address pattern region Aa described above. Note that the lengths and shapes of the convex parts 40a and the concave parts 40b formed inside the non-servo signal region Axb are not affected by the lengths of the other patterns and can be freely set within a range where no problems occur in the imprint process during manufacturing.

On the magnetic disk 10, as described above, the inscribed circle with the largest diameter (the diameter L1) out of the inscribed circles of the concave parts 40b formed in the address pattern region Aa is the inscribed circle with the largest diameter out of the inscribed circles of the concave parts 40b formed inside the servo pattern region As. In other words, on the magnetic disk 10, the convex parts 40a are formed in the servo pattern region As so that concave parts 40b with open surfaces that can have an inscribed circle with a larger diameter than the diameter L1 of the inscribed circle Qa1 described above are not present in the servo pattern region As. Also, on the magnetic disk 10, the length L4 along the radial direction (the radial direction of the magnetic disk 10) of the concave parts 40b (inter-track concave parts) formed in the data recording region At is sufficiently shorter than the diameter L1 of the inscribed circle Qa1 described above. In other words, on the magnetic disk 10, the convex parts 40a (data recording tracks) are formed in the data recording region At so that concave parts 40b with open surfaces that can have an inscribed circle with a larger diameter than the diameter L1 of the inscribed circle Qa1 described above are not present in the data recording region At.

Next, the method of manufacturing the magnetic disk 10 will be described.

Figure 12:
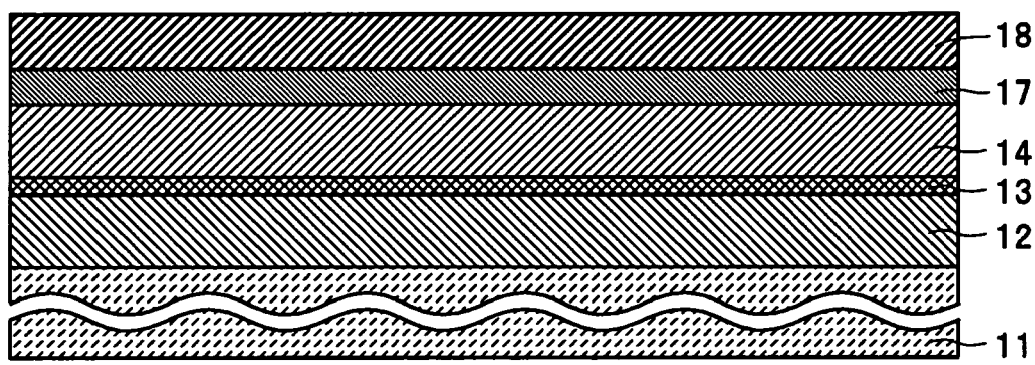
FIG. 12 is a cross-sectional view showing the multilayer structure of a preform.
Figure 13:
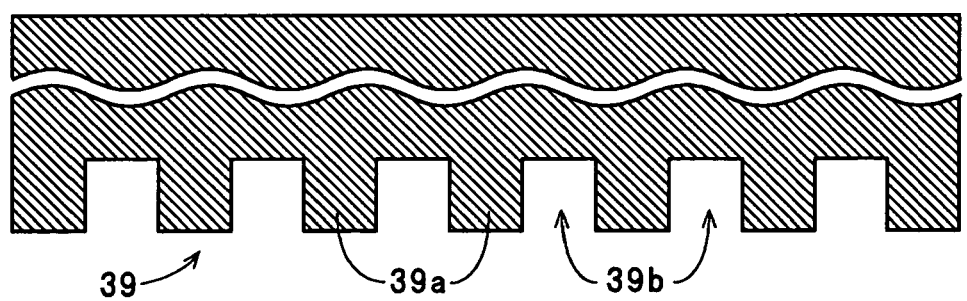
FIG. 13 is a cross-sectional view of a stamper.

When manufacturing the magnetic disk 10 described above, a preform 20 shown in FIG. 12 and a stamper 30 shown in FIG. 13 are used. Here, as shown in FIG. 12, the preform 20 is constructed by forming the soft magnetic layer 12, the intermediate layer 13, and the magnetic layer 14 in that order on the glass substrate 11 and a mask layer 17 and a resin layer (resist layer) 18 with a thickness of around 80 nm are formed on the magnetic layer 14. On the other hand, the stamper 30 is one example of a stamper for manufacturing a magnetic recording medium according to the present invention and as shown in FIG. 13 is constructed by forming a concave/convex pattern 39 that can form a concave/convex pattern 41 for forming the concave/convex pattern 40 (the data track pattern 40t and the servo pattern 40s) on the magnetic disk 10 so as to be capable of manufacturing the magnetic disk 10 by an imprinting method. In this case, the concave/convex pattern 39 of the stamper 30 is formed so that convex parts 39a correspond to the concave parts 40b in the concave/convex pattern 40 of the magnetic disk 10 and concave parts 39b correspond to the convex parts 40a in the concave/convex pattern 40.

Figure 14:
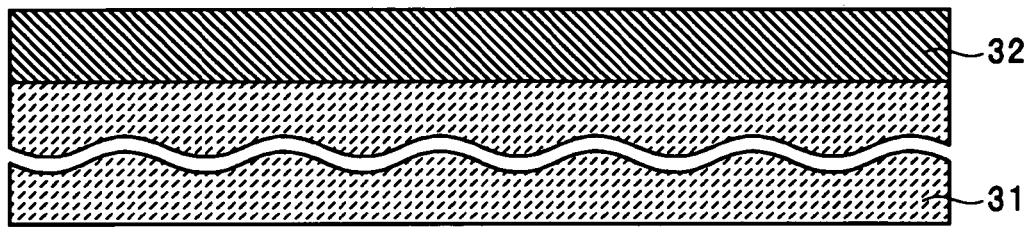
FIG. 14 is a cross-sectional view of a state where a resist layer has been formed on a glass substrate.
Figure 15:
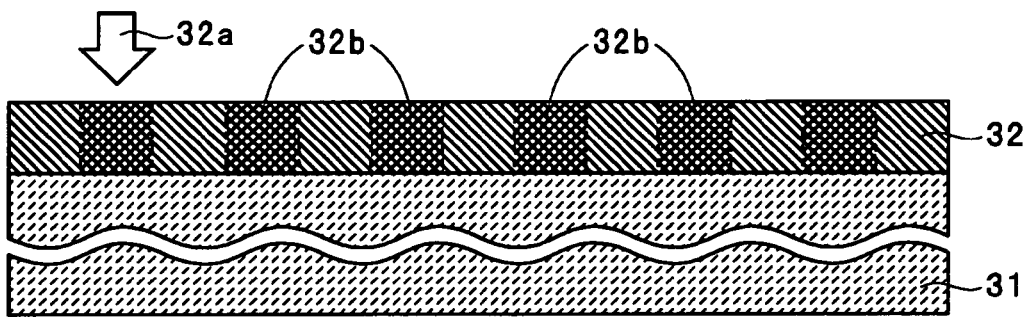
FIG. 15 is a cross-sectional view of a state where latent images have been formed by emitting an electron beam onto a resist layer.
Figure 16:
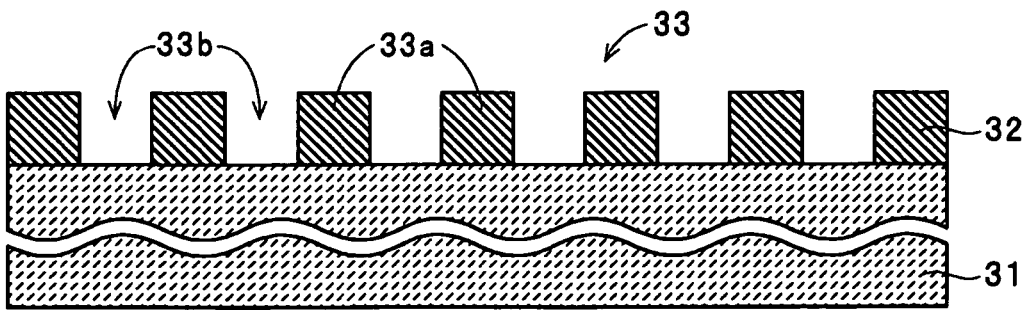
FIG. 16 is a cross-sectional view of a state where a concave/convex pattern is formed by carrying out a developing process on the resist layer in which the latent images have been formed.
Figure 17:
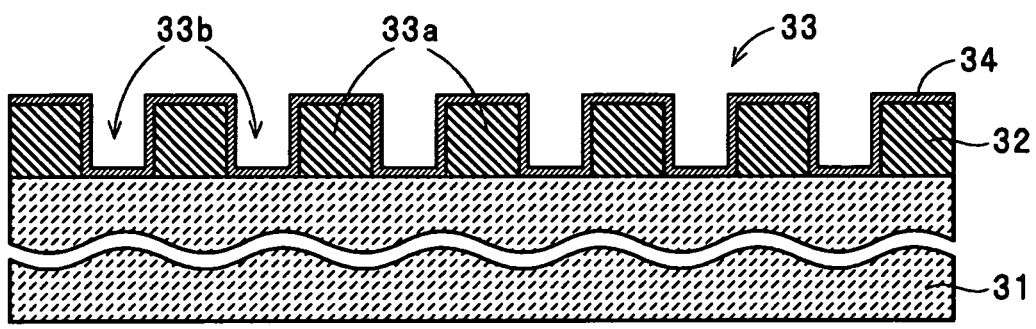
FIG. 17 is a cross-sectional view of a state where a nickel layer is formed so as to cover the concave/convex pattern.
Figure 18:
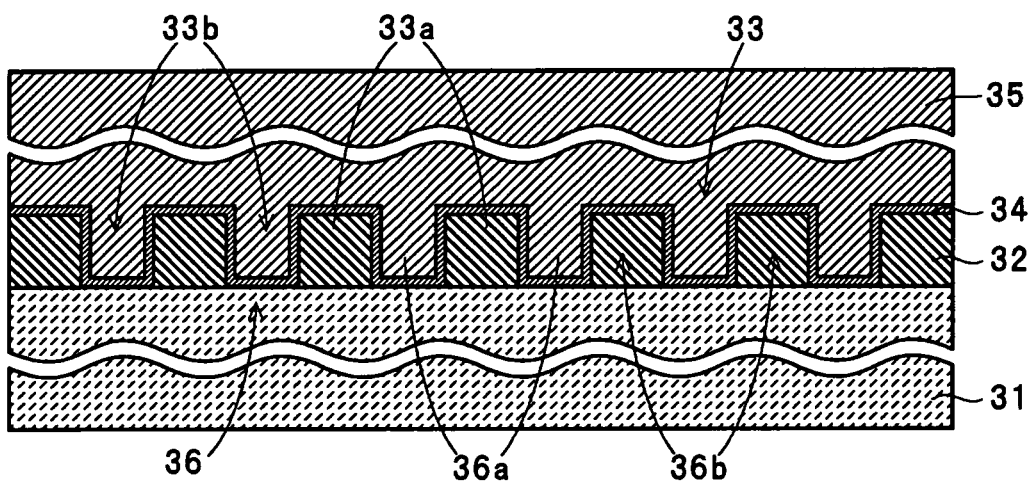
FIG. 18 is a cross-sectional view of a state where a nickel layer is formed by a plating process.

When manufacturing the stamper 30, as shown in FIG. 14, first a positive-type resist, for example, is spin coated on a glass substrate 31 and baked to form a resist layer 32 with a thickness of around 150 nm on the glass substrate 31. Next, as shown in FIG. 15, an electron beam 32a is emitted at positions corresponding to the concave parts 39b of the stamper 30 (that is, positions corresponding to the convex parts 40a of the magnetic disk 10) to form a plurality of latent images 32b (track patterns and servo patterns) in the resist layer 32. Next, by developing the resist layer 32, as shown in FIG. 16, a concave/convex pattern 33 (convex parts 33a and concave parts 33b) composed of the resist layer 32 is formed on the glass substrate 31. After this, as shown in FIG. 17, a nickel layer 34 with a thickness of around 30 nm is formed by sputtering so as to cover the convex parts 33a and the concave parts 33b of the concave/convex pattern 33. Next, by carrying out a plating process that uses the nickel layer 34 as an electrode, as shown in FIG. 18, a nickel layer 35 is formed on the nickel layer 34. At this time, the concave/convex pattern 33 formed by the resist layer 32 is transferred to the laminated body composed of the nickel layers 34 and 35, thereby forming a concave/convex pattern 36 in the laminated body composed of the nickel layers 34 and 35 where concave parts 36b are formed at positions of the convex parts 33a in the concave/convex pattern 33 and convex parts 36a are formed at the positions of the concave parts 33b.

Figure 19:
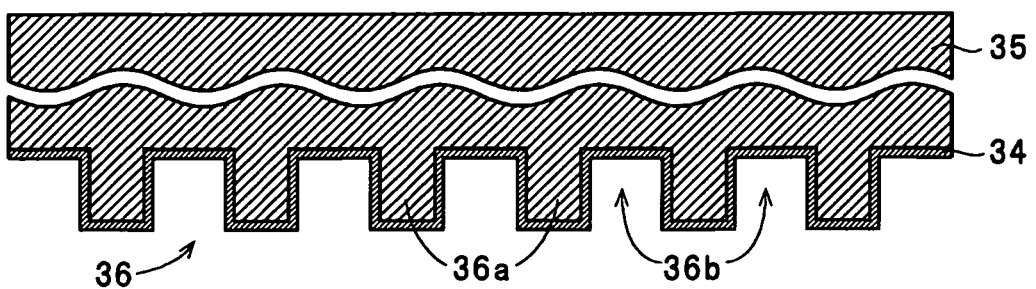
FIG. 19 is a cross-sectional view of a stamper formed by separating the laminated body of the nickel layers from the glass substrate.
Figure 20:
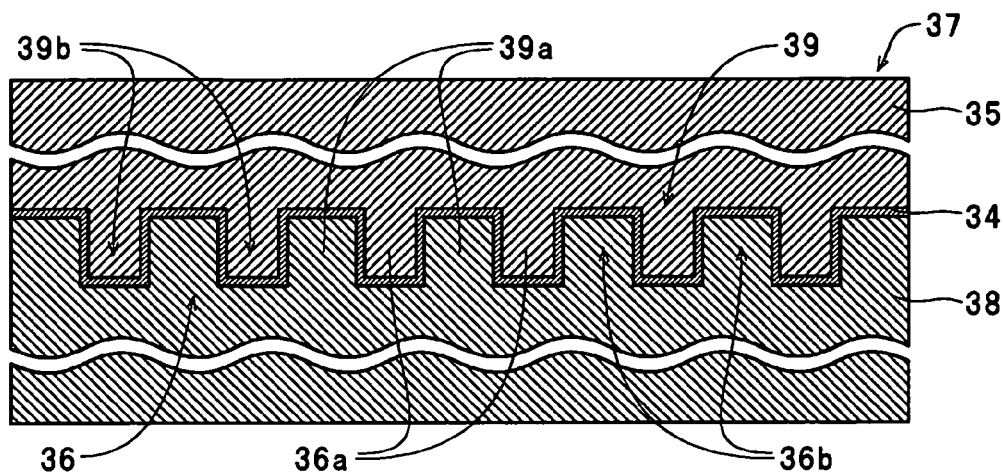
FIG. 20 is a cross-sectional view of a state where a nickel layer is formed on a surface of a stamper on which a concave/convex pattern is formed (a state where the concave/convex pattern has been transferred to the nickel layer)

Next, by soaking the laminated body composed of the glass substrate 31, the resist layer 32, and the nickel layers 34 and 35 in a resist remover, the resist layer 32 present between the glass substrate 31 and the laminated body composed of the nickel layers 34 and 35 is removed. By doing so, as shown in FIG. 19, the laminated body composed of the nickel layers 34 and 35 is separated from the glass substrate 31 to complete a stamper 37. Next, the stamper 37 is used as a master stamper to fabricate the stamper 30 (a "mother stamper"). More specifically, first by carrying out a surface treatment on the stamper 37, an oxide film is formed on the surface of the stamper 37 on which the concave/convex pattern 36 is formed. After this, as shown in FIG. 20, a nickel layer 38 is formed by carrying out a plating process on the stamper 37 on which the formation of the oxide layer has been completed. At this time, the concave/convex pattern 36 of the stamper 37 is transferred to the nickel layer 38 to form the concave/convex pattern 39 in the nickel layer 38 by forming the concave parts 39b at the positions of the convex parts 36a and the convex parts 39a at the positions of the concave parts 36b. Next, after the stamper 37 has been separated from the nickel layer 38, the rear surface (the rear surface with respect to the surface on which the concave/convex pattern 39 is formed) of the nickel layer 38 is subjected to a polishing process to smooth the surface, thereby completing the stamper 30 as shown in FIG. 13.

On the other hand, when manufacturing the preform 20, first after the soft magnetic layer 12 has been formed on the glass substrate 11 by sputtering CoZrNb alloy on the glass substrate 11, the intermediate layer 13 is formed by sputtering an intermediate layer forming material on the soft magnetic layer 12. Next, by sputtering CoCrPt alloy on the intermediate layer 13, the magnetic layer 14 is formed with a thickness of around 15 nm. After this, the mask layer 17 is formed on the magnetic layer 14, and the resin layer 18 is formed with a thickness of around 80 nm on the mask layer 17 by spin coating a resist, for example. By doing so, the preform 20 is completed.

Figure 21:
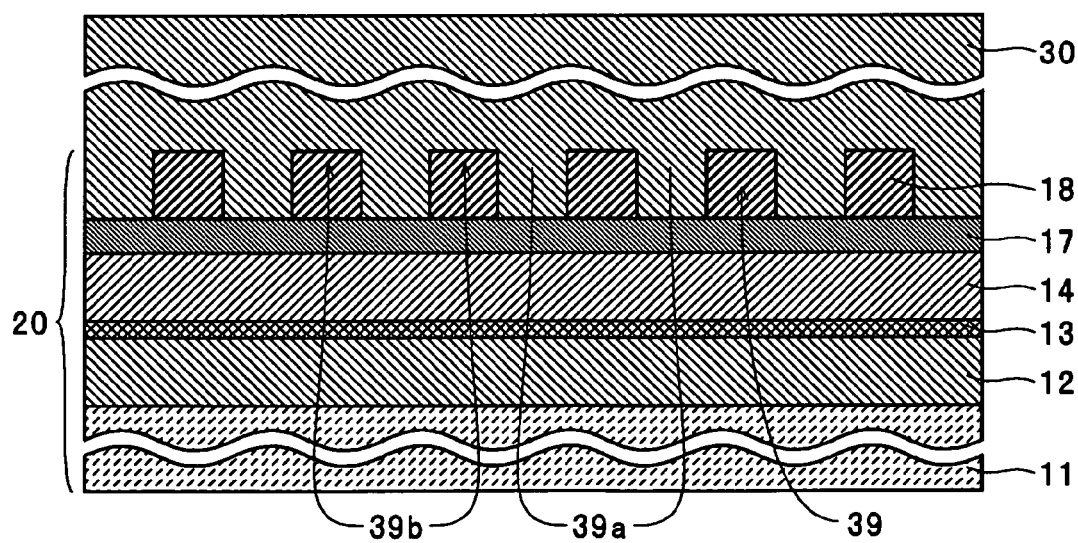
FIG. 21 is a cross-sectional view of a state where a concave/convex pattern of the stamper is pressed onto a resin layer of the preform.

Next, as shown in FIG. 21, the concave/convex pattern 39 of the stamper 30 is transferred to the resin layer 18 of the preform 20 by an imprint method. More specifically, by pressing the surface of the stamper 30 on which the concave/convex pattern 39 is formed onto the resin layer 18 of the preform 20, the convex parts 39a of the concave/convex pattern 39 are pressed into the resin layer 18 of the preform 20. Here, as described above, on the magnetic disk 10 manufactured using the stamper 30, the convex parts 40a are formed so that in the entire servo pattern region As and the entire data recording region At, there are no concave parts 40b with open surfaces that can have an inscribed circle with a larger diameter than the diameter L1 of the inscribed circle Qa1 (i.e., so that concave parts 40b with excessively wide open surfaces are not present). Accordingly, on the stamper 30 used to manufacture the magnetic disk 10, the concave parts 39b are formed so that in the entire servo pattern region As and the entire data recording region At of the magnetic disk 10, there are no convex parts 39a with protruding end surfaces that can have an inscribed circle with a larger diameter than the diameter L1 of the inscribed circle Qa1 (i.e., so that convex parts 39a with excessively wide protruding end surfaces are not present). The convex parts 39a can therefore be smoothly pressed into the resin layer 18, resulting in the convex parts 39a being pressed into the resin layer 18 sufficiently deeply without thick residue being produced between the front ends of the convex parts 39a of the stamper 30 and the mask layer 17 of the preform 20.

Figure 22:
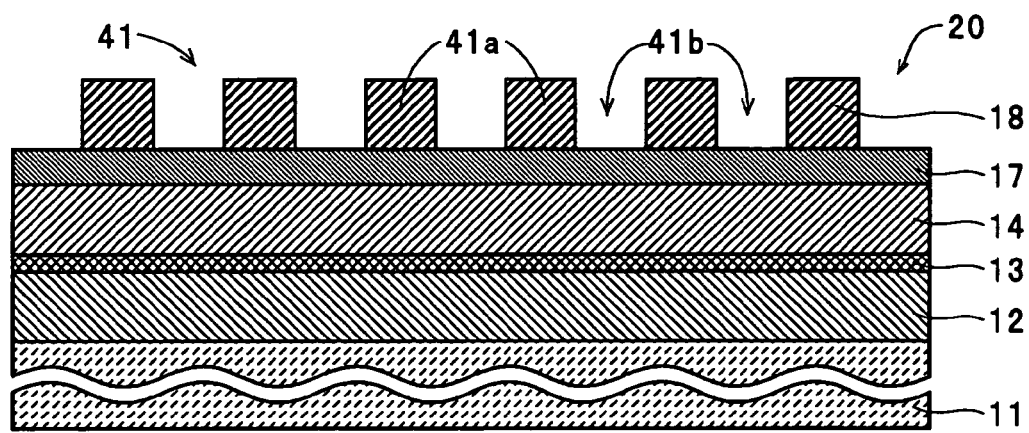
FIG. 22 is a cross-sectional view of a state where the stamper has been separated from the resin layer in the state shown in FIG. 21 to form a concave/convex pattern (a resin mask) on a mask layer.
Figure 23:
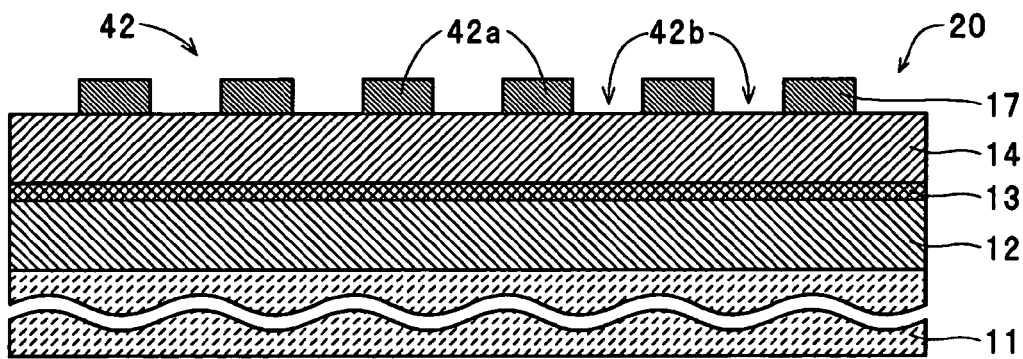
FIG. 23 is a cross-sectional view of a state where the mask layer has been etched with the concave/convex pattern as a mask to form a concave/convex pattern (mask) on a magnetic layer.
Figure 24:
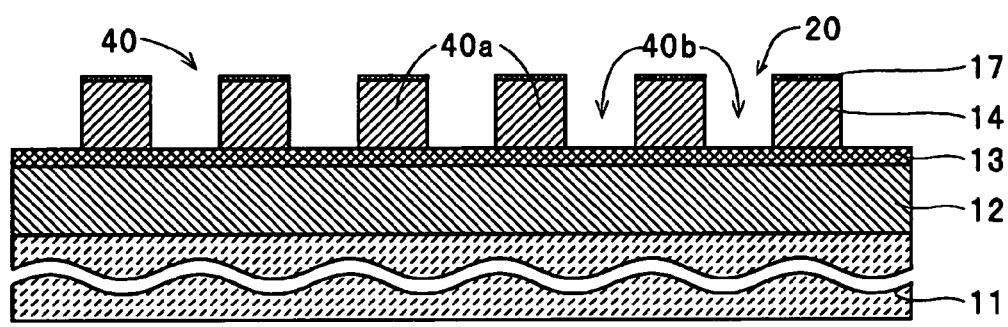
FIG. 24 is a cross-sectional view of a state where the magnetic layer has been etched with the concave/convex pattern as a mask to form a concave/convex pattern on an intermediate layer.

Next, the stamper 30 is separated from the preform 20, and in addition, by removing resin remaining on the base surfaces (the "residue" mentioned above: not shown) by carrying out an oxygen plasma process, as shown in FIG. 22, the concave/convex pattern 41 composed of the resin layer 18 is formed on the mask layer 17 of the preform 20. Next, by carrying out an etching process using the concave/convex pattern 41 (the resin layer 18) described above as a mask, the mask layer 17 exposed from the mask (the convex parts 41a) at the base parts of the concave parts 41b of the concave/convex pattern 41 are etched as shown in FIG. 23 to form a concave/convex pattern 42 with the convex parts 42a and the concave parts 42b in the mask layer 17 of the preform 20. After this, by carrying out an etching process using the concave/convex pattern 42 (the mask layer 17) as a mask, the magnetic layer 14 exposed from the mask (the convex parts 42a) at the base parts of the concave parts 42b in the concave/convex pattern 42 is etched. By doing so, as shown in FIG. 24, the concave/convex pattern 40 (the data track pattern 40t and the servo pattern 40s) including the convex parts 40a with protruding end surfaces whose widths are substantially equal to the open surfaces of the concave parts 39b of the stamper 30 and concave parts 40b with open surfaces whose widths are substantially equal to the protruding end surfaces of the convex parts 39a is formed in the magnetic layer 14 of the preform 20. Next, by carrying out a selective etching process on the mask layer 17 remaining on the convex parts 40a, the remaining mask layer 17 is completely removed to expose the protruding end surfaces of the convex parts 40a.

Figure 25:
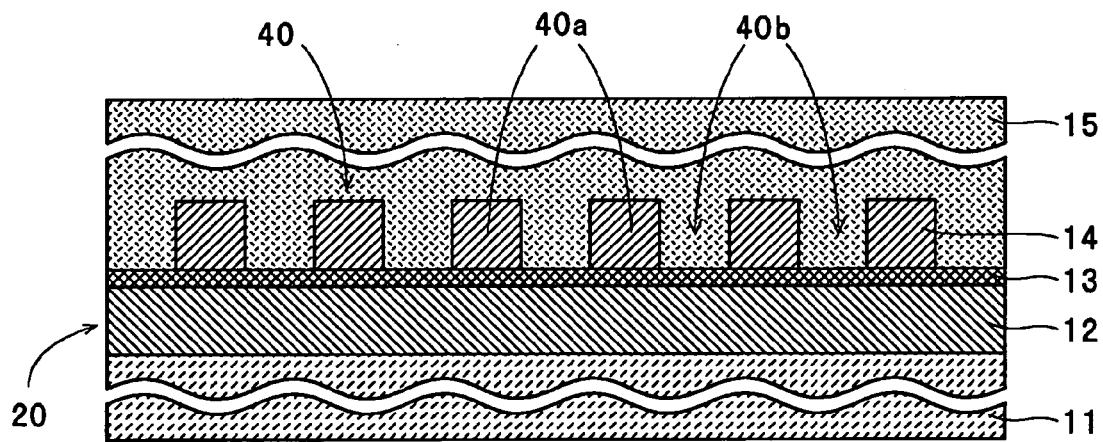
FIG. 25 is a cross-sectional view of the preform in a state where a layer of the non-magnetic material is formed to cover the concave/convex pattern.
Figure 26:
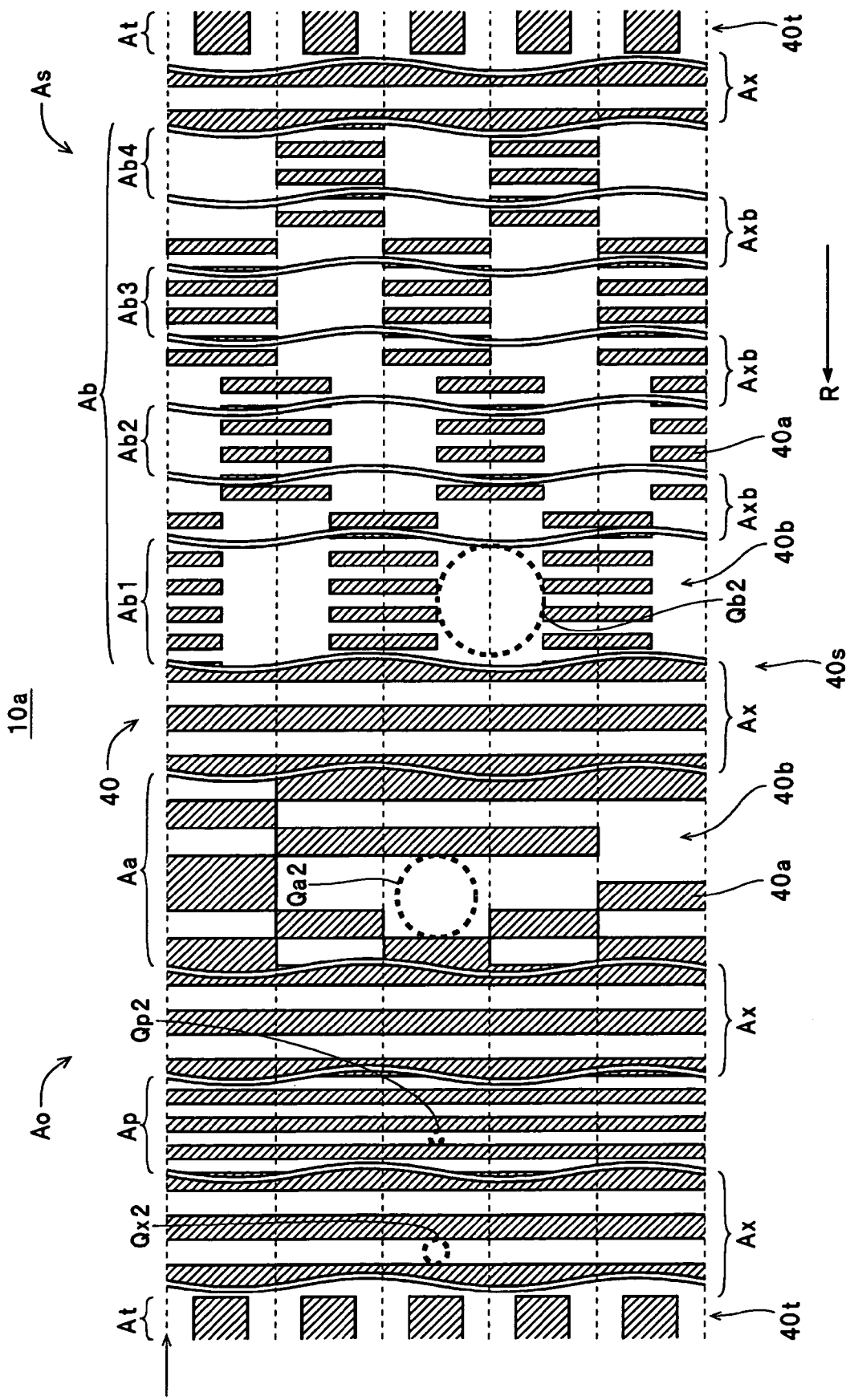
FIG. 26 is a plan view of a magnetic disk showing another example of various patterns formed in a data recording region and a servo pattern region in an outer periphery region.

Next, as shown in FIG. 25, SiO$_2$ is sputtered as the non-magnetic material 15. When doing so, a sufficient amount of non-magnetic material 15 is sputtered to completely fill the concave parts 40b with the non-magnetic material 15 and to form a layer of the non-magnetic material 15 with a thickness of around 60 nm, for example, on the convex parts 40a. After this, ion beam etching is carried out on the layer of the non-magnetic material 15 on the magnetic layer 14 (on the convex parts 40a and on the concave parts 40b). When doing so, the ion beam etching continues until the protruding end surfaces of the convex parts 40a are exposed from the non-magnetic material 15. By doing so, the surface of the preform 20 is made flatter. Next, after the protective layer 16 has been formed by forming a thin film of diamond-like carbon (DLC) by CVD so as to cover the surface of the preform 20, a Fomblin lubricant is applied to the surface of the protective layer 16 with an average thickness of around 2 nm, for example. By doing so, as shown in FIG. 4, the magnetic disk 10 is completed.

In the hard disk drive 1 equipped with the magnetic disk 10, as described above, during the recording and reproducing of data on the magnetic disk 10, the control unit 6 determines that the data corresponding to the concave/convex pattern 40 formed in the non-servo signal regions Ax and the non-servo signal regions Axb is different data to the servo data used for a tracking servo. More specifically, out of the data including the servo data outputted from the detecting unit 4, the control unit 6 controls the driver 5 based on the data corresponding to the concave/convex patterns 40 formed in the preamble pattern region Ap, the address pattern region Aa, and the burst pattern region Ab (aside from the non-servo signal region Axb) to move the actuator 3b and thereby make the magnetic head 3 on-track to the desired track. As a result, it is possible to carry out the recording and reproducing of data via the magnetic head 3 that is made on-track to the convex parts 40a (i.e., a data recording track) inside the data recording region At without such operation being affected by the presence of the concave/convex patterns 40 (i.e., the dummy patterns) formed in the non-servo signal regions Ax, Axb.

In this way, according to the magnetic disk 10 and the hard disk drive 1, by forming the convex parts 40a in the servo pattern region As so that the inscribed circle Qa1 with the largest diameter out of the inscribed circles on the open surfaces of the concave parts 40b formed in the address pattern region Aa is the inscribed circle with the largest diameter out of the inscribed circles on the open surfaces of the concave parts 40b formed in the servo pattern region As, since there are no concave parts 40b with open surfaces that can have inscribed circles with a larger diameter than the diameter L1 of the inscribed circle Qa1 inside the servo pattern region As, when imprinting is carried out to form the concave/convex pattern 40 inside the servo pattern region As (in this example, during the process that transfers the concave/convex pattern 39 of the stamper 30 to the resin layer 18 of the preform 20), it is possible to smoothly press the convex parts 39a of the stamper 30 into the resin layer 18 without using a stamper with convex parts whose protruding end surfaces are excessively wide. By doing so, since it is possible to avoid a state where thick residue remains on the mask layer 17 when the concave/convex pattern 39 of the stamper 30 is transferred to the resin layer 18, a situation where the concave parts 41b become excessively wide due to the process that removes the residue is avoided. Accordingly, it is possible to avoid a situation where the concave parts 40b that are finally formed at the positions of the concave parts 41b are excessively wide. This means that it is possible to provide a magnetic disk 10 with servo patterns from which a magnetic signal can be reliably read and a hard disk drive 1 equipped with such magnetic disk 10.

Also, according to the magnetic disk 10 and the hard disk drive 1, by forming the data recording tracks (the convex parts 40a) in the data recording regions At so that the length L4 along the radial direction of the concave parts 40b is equal to or smaller than the diameter of the largest inscribed circle out of the inscribed circles on the open surfaces of the concave parts 40b formed in the servo pattern regions As (in this example, the diameter L1 of the inscribed circle Qa1 on the open surface of the concave parts 40b formed in the address pattern regions Aa), when imprinting is carried out to form the concave/convex pattern 40 inside the data recording regions At (in this example, during the process that transfers the concave/convex pattern 39 of the stamper 30 to the resin layer 18 of the preform 20), it is possible to smoothly press the convex parts 39a of the stamper 30 into the resin layer 18 without using a stamper with convex parts whose protruding end surfaces are excessively wide. By doing so, it is possible to provide a magnetic disk 10 with a track pattern onto and from which a magnetic signal can be reliably written and read (i.e., a track pattern for which stabilized recording and reproducing are possible) and a hard disk drive 1 equipped with such magnetic disk 10.

In addition, according to the magnetic disk 10 and the hard disk drive 1, by constructing the servo pattern regions As so as to include the plurality of types of first function regions (in this example, the preamble pattern region Ap, the address pattern region Aa, and the burst region Ab) in which control signals for tracking servo control are recorded by the concave/convex patterns 40 during manufacturing and second function regions (the non-servo signal regions Ax) in which concave/convex patterns 40 of a different type to the concave/convex patterns 40 of the first function regions are formed, and forming the convex parts 40a in the non-servo signal regions Ax so that the diameter of the inscribed circle with the largest diameter out of the inscribed circles on the open surfaces of the concave parts 40b formed in the non-servo signal regions Ax is equal to or smaller than the diameter of the largest inscribed circle Qa1 out of the inscribed circles on the open surfaces of the concave parts 40b formed in the address pattern region Aa, unlike the conventional magnetic disk 10z where the entire region of the non-servo signal regions Axz, Axbz are composed of concave parts, it is possible to smoothly press the convex parts 39a of the stamper 30 into the resin layer 18 without using a stamper with convex parts whose protruding end surfaces are excessively wide (convex parts with protruding end surfaces whose widths are equal to the entire widths of the second function regions). By doing so, since it is possible to avoid a situation where thick residue is produced in the non-servo signal regions Ax during manufacturing and prevent the concave parts 41b from widening due to a process that removes the residue, it is possible to provide a magnetic disk 10 with servo patterns from which a magnetic signal can be reliably read and a hard disk drive 1 equipped with such magnetic disk 10.

Also, according to the hard disk drive 1, by including the control unit 6 that carries out a tracking servo control process based on a predetermined signal read from a servo pattern region As on the magnetic disk 10, it is possible to carry out recording and reproducing of data via the magnetic head 3 that is made on-track to the convex parts 40a (a data recording track) inside the data recording region At without being affected by the presence of the concave/convex patterns 40 (dummy patterns) formed in the non-servo signal regions Ax (the second function regions).

Also, according to the stamper 30 described above, by forming the concave/convex pattern 39 including the convex parts 39a formed corresponding to the concave parts 40b of the concave/convex pattern 40 of the magnetic disk 10 and the concave parts 39b formed corresponding to the convex parts 40a of the concave/convex pattern 40 of the magnetic disk 10, when carrying out imprinting on the preform 20, since there are no convex parts 39a with wide protruding end surfaces (for example, convex parts 39a where both the length along the direction of rotation and the length along the radial direction are excessively long) on the stamper 30, the concave/convex pattern 39 (the convex parts 39a) can be smoothly pressed into the preform 20. Accordingly, it is possible to avoid a situation where problems occur due to the convex parts 39a being insufficiently pressed in (a situation where the concave parts 41b become excessively wide due to thick residue being produced on the mask layer 17). By doing so, it is possible to manufacture a magnetic disk 10 from which servo data can be read reliably.

Figure 27:
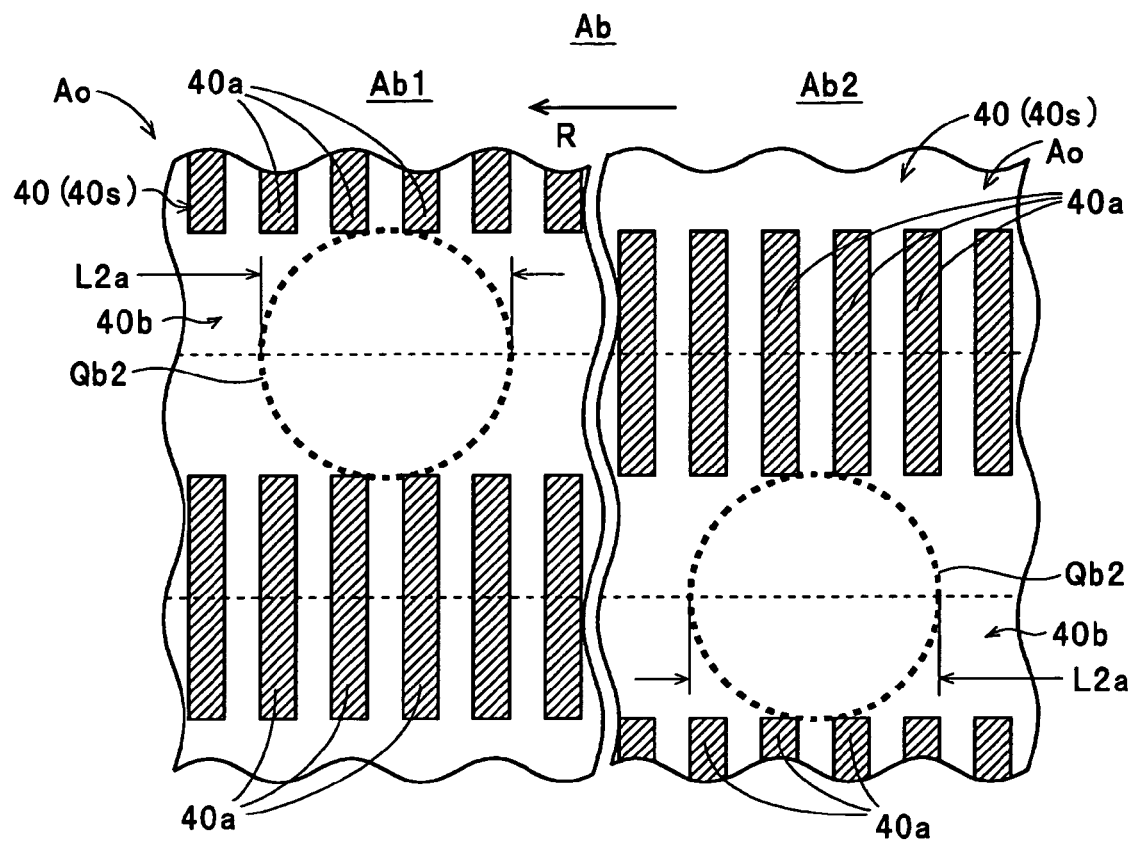
FIG. 27 is a plan view of a burst pattern showing one example of a burst pattern formed in the burst pattern region of the servo pattern region shown in FIG. 26.
Figure 28:
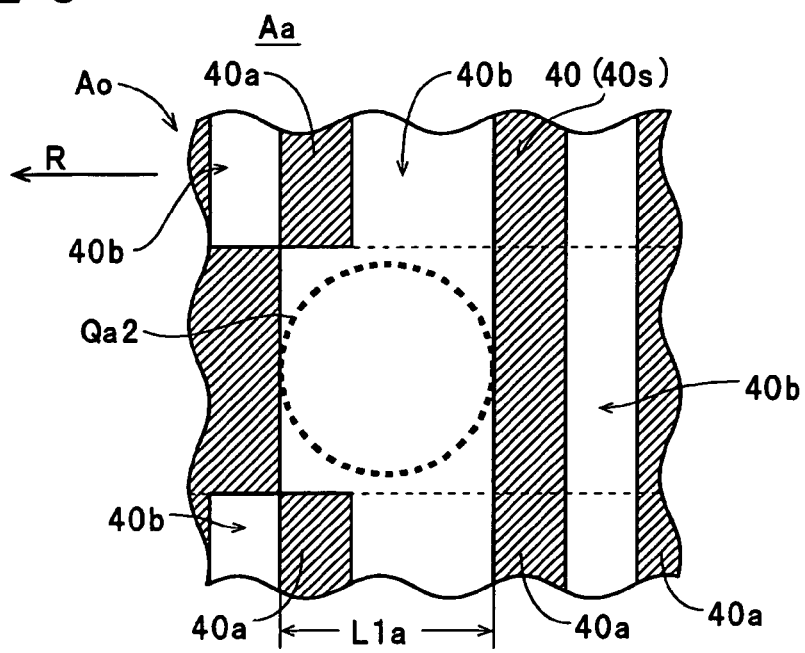
FIG. 28 is a plan view of an address pattern showing one example of an address pattern formed in the address pattern region of the servo pattern region shown in FIG. 26.

It should be noted that the present invention is not limited to the construction described above. For example, although on the magnetic disk 10 described above, the convex parts 40a are formed inside the servo pattern regions As so that the inscribed circle Qa1 with the largest diameter (in the above example, the diameter L1) out of the inscribed circles on the open surfaces of the concave parts 40b formed inside the address pattern region Aa is the inscribed circle with the largest diameter out of the inscribed circles on the open surfaces of all of the concave parts 40b formed inside the servo pattern regions As, the present invention is not limited to this and as one example, like a magnetic disk 10a shown in FIG. 26, the convex parts 40a can be formed inside the servo pattern regions As so that an inscribed circle Qb2 with the largest diameter out of the inscribed circles on the open surfaces of the concave parts 40b formed inside the burst pattern regions Ab (the first to fourth burst regions Ab1 to Ab4) is the inscribed circle with the largest diameter out of the inscribed circles (in this example, the inscribed circles Qx2, Qp2, Qa2) on the open surfaces of all of the concave parts 40b formed inside the servo pattern regions As. More specifically, on the magnetic disk 10a, as shown in FIG. 27, the inscribed circle Qb2 with the largest diameter out of the inscribed circles on the open surfaces of the concave parts 40b formed in the burst pattern regions Ab contacts (four-point contact) four convex parts 40a in the rows of convex parts 40a aligned along the direction of rotation of the magnetic disk 10. Also, as shown in FIG. 28, the inscribed circle Qa2 with the largest diameter out of the inscribed circles on the open surfaces of the concave parts 40b formed in the address pattern region Aa contacts (two-point contact) the convex parts 40a at both ends of the open surfaces of the concave parts 40b in the direction of rotation, and the diameter L1a of the inscribed circle Qa2 is smaller than the diameter L2a of the inscribed circle Qb2 described above.

On the magnetic disk 10a, as described above, the inscribed circle Qb2 with the largest diameter (the diameter L2a) out of the inscribed circles on the open surfaces of the concave parts 40b formed on the burst pattern regions Ab is the inscribed circle with the largest diameter out of the inscribed circles on the open surfaces of the concave parts 40b formed inside the servo pattern regions As. In other words, on the magnetic disk 10a, the concave/convex patterns 40 are formed inside the servo pattern regions As so that concave parts 40b with open surfaces that can have inscribed circles with a larger diameter than the diameter L2a of the inscribed circle Qb2 described above are not present. Also, on the magnetic disk 10a, the length L4 along the radial direction of the concave parts 40b between the respective convex parts 40a (the inter-track concave parts) in the data recording regions At is sufficiently shorter than the diameter L2a of the inscribed circle Qb2 described above. In other words, on the magnetic disk 10a, the concave/convex patterns 40 are formed in the data recording regions At so that concave parts 40b with open surfaces that can have inscribed circles with a larger diameter than the diameter L2a of the inscribed circle Qb2 described above are not present.

Accordingly, according to the magnetic disk 10a, in the same way as the magnetic disk 10 described above, when forming the concave/convex pattern 41, which is used to form the concave/convex pattern 40 on the preform 20, in the resin layer 18 (i.e., during imprinting), the convex parts 39a of the stamper 30 can be smoothly pressed into the resin layer 18, and as a result, it is possible to press the convex parts 39a into the resin layer 18 sufficiently deeply without producing thick residue between the front ends of the convex parts 39a of the stamper 30 and the mask layer 17 of the preform 20. As a result, since it is possible to avoid having thick residue produced, it is possible to avoid a situation where the concave parts 41b become excessively-wide in the process that removes the residue. By doing so, like the magnetic disk 10 described above, it is possible to provide a magnetic disk 10a from which servo data can be read reliably.

Figure 29:
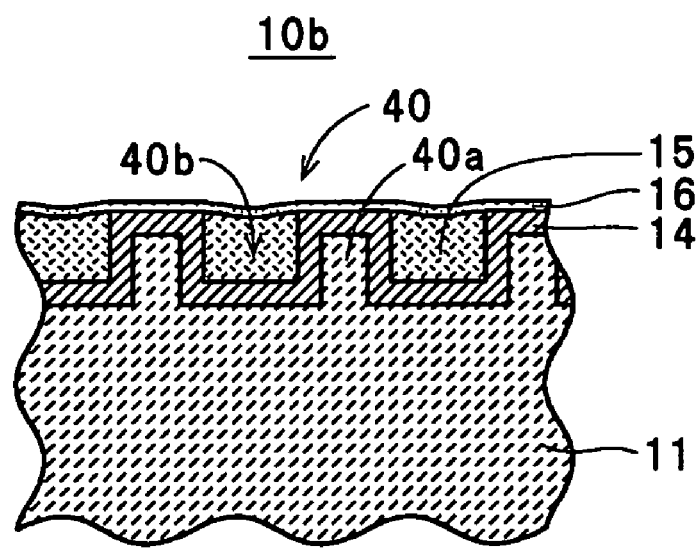
FIG. 29 is a cross-sectional view showing the multilayer structure of another magnetic disk.
Figure 30:
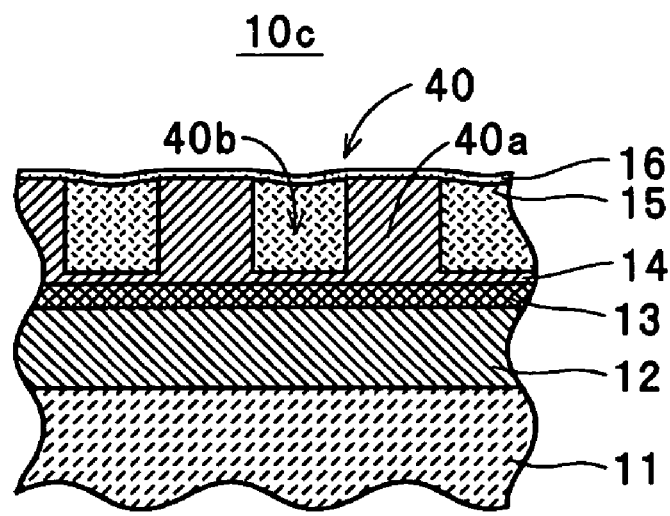
FIG. 30 is a cross-sectional view showing the multilayer structure of yet another magnetic disk.
Figure 31:
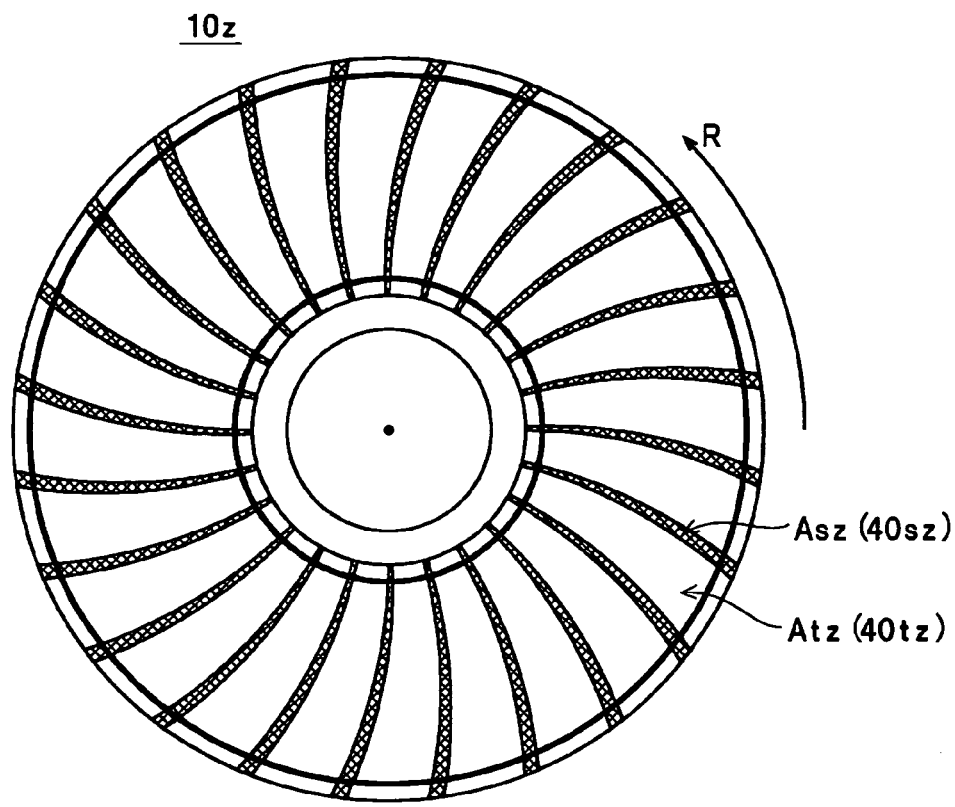
FIG. 31 is a plan view of a conventional magnetic disk.
Figure 32:
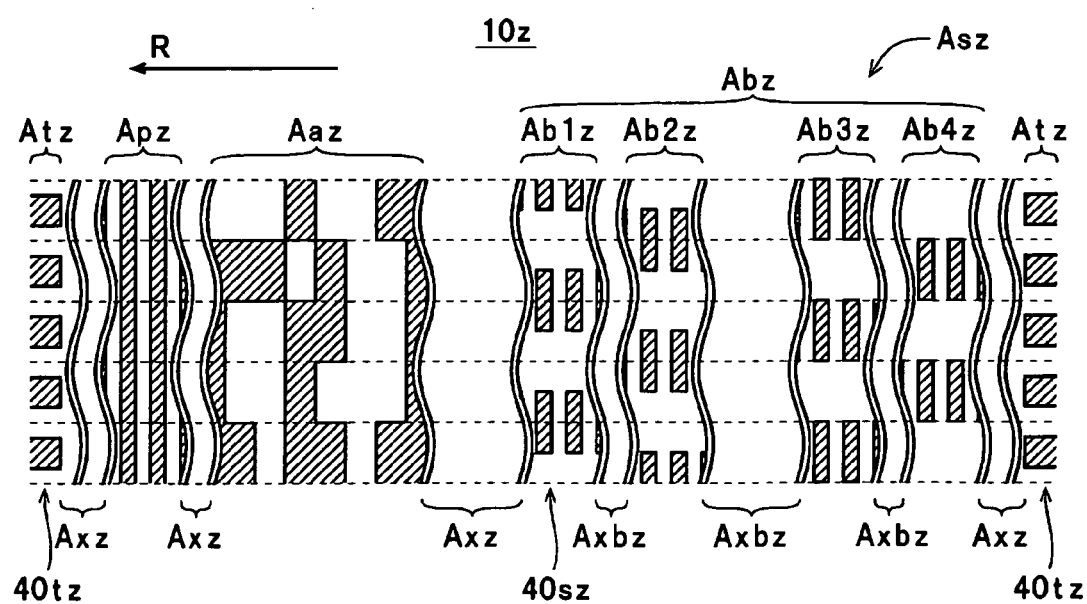
FIG. 32 is a plan view of the conventional magnetic disk showing one example of various patterns formed in a data recording region and a servo pattern region.
Figure 33:
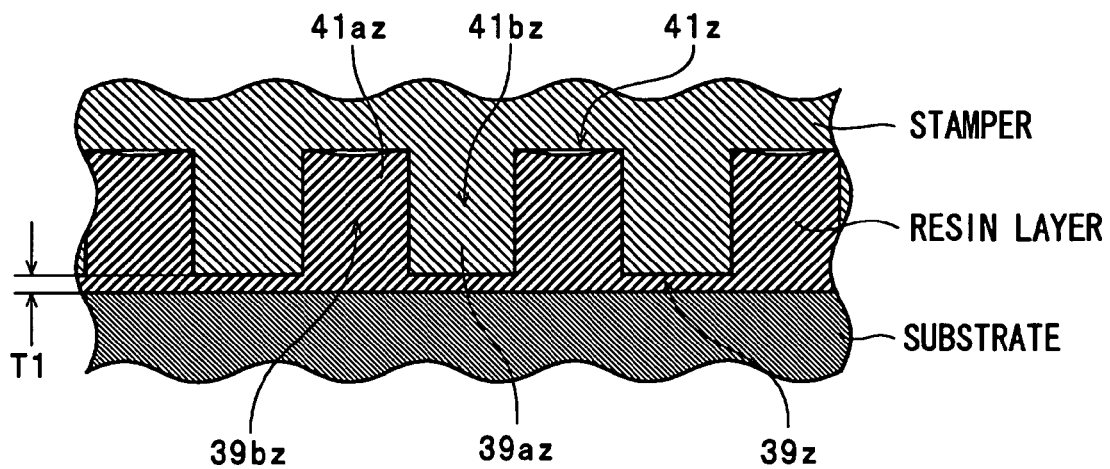
FIG. 33 is a cross-sectional view of a resin layer in a state where convex parts (convex parts with narrow protruding end surfaces) of a stamper have been pressed in during a manufacturing process of the conventional magnetic disk.
Figure 34:
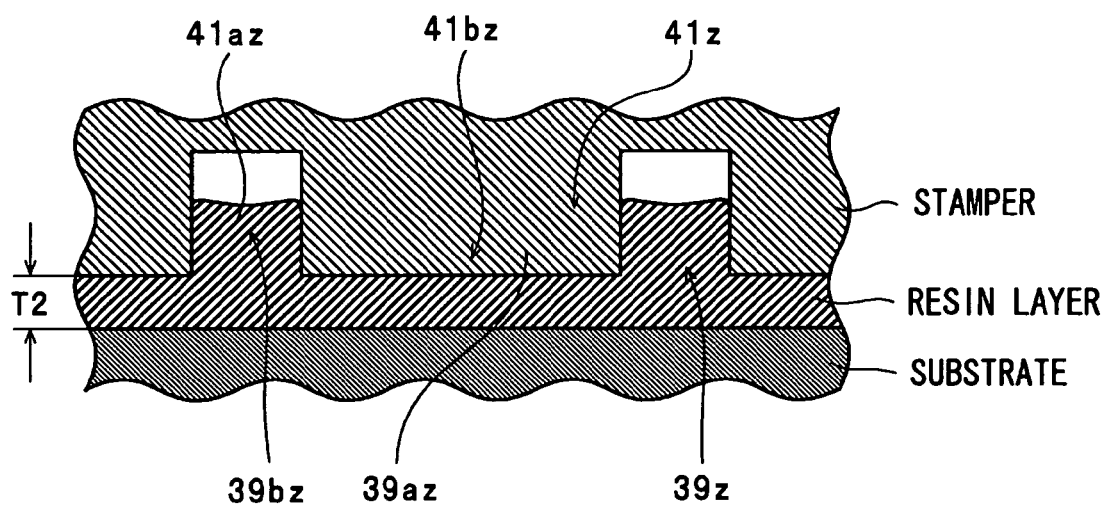
FIG. 34 is a cross-sectional view of a resin layer in a state where a convex part (a convex part with a wide protruding end surface) of a stamper has been pressed in during a manufacturing process of the conventional magnetic disk.

Also, on the magnetic disk 10 described above, although the entire regions from the protruding end parts to the base end parts of the convex parts 40a of the concave/convex pattern 40 are formed of the magnetic layer 14 (magnetic material), the convex parts that construct the concave/convex pattern of the present invention are not limited to this. More specifically, like a magnetic disk 10b shown in FIG. 29, for example, by forming a thin magnetic layer 14 so as to cover a concave/convex pattern formed in the glass substrate 11 (a concave/convex pattern where the convexes and concaves have the same positional relationship as the concave/convex pattern 40), it is possible to compose the concave/convex pattern 40 of a plurality of convex parts 40a whose surfaces are formed of magnetic material and a plurality of concave parts 40b whose base parts are also formed of the magnetic material. Also, like a magnetic disk 10c shown in FIG. 30, it is possible to construct a concave/convex pattern 40 where not only the convex parts 40a but also the base parts of the concave parts 40b are formed of the magnetic layer 14. As another example, it is also possible to construct the concave/convex pattern 40 (not shown) so as to include convex parts 40a where only the protruding end parts of the convex parts 40a in the concave/convex pattern 40 are formed of the magnetic layer 14 and the base end parts of the convex parts 40a are formed of a non-magnetic material or a soft magnetic material.

Also, although dummy patterns (the concave/convex patterns 40) are formed in the non-servo signal regions Ax and the non-servo signal regions Axb on the magnetic disk 10 described above, the present invention is not limited to this. For example, it is possible to construct a magnetic disk by setting non-servo signal regions whose entire regions are composed of convex parts 40a between a data recording region At and the preamble pattern region Ap, between the preamble pattern region Ap and the address pattern region Aa, between the address pattern region Aa and the burst pattern region Ab, and between the burst pattern region Ab and another data recording region At and also setting non-servo signal regions whose entire regions are composed of convex parts 40a between the first burst region Ab1 and the second burst region Ab2, between the second burst region Ab2 and the third burst region Ab3, and between the third burst region Ab3 and the fourth burst region Ab4 in the burst pattern region Ab.

Also, although a concave/convex pattern 40 with belt-shaped concave parts 40b where the length along the direction of rotation in the outer periphery region Ao is equal to the length L4 along the radial direction of the concave parts 40b inside the data recording region At (i.e., equal to the width of the inter-track concave parts present between the data recording tracks) is formed inside the non-servo signal regions Ax as a dummy pattern on the magnetic disk 10 described above, the present invention is not limited to this. For example, like the non-servo signal regions Axb on the magnetic disk 10, a construction where the same type of patterns as the concave/convex patterns 40 formed inside regions adjacent to the non-servo signal regions Ax in the direction of rotation are formed as dummy patterns (i.e., a construction where no "second function regions" for the present invention are present inside the servo pattern region As) and a construction where concave/convex patterns 40 of arbitrary shapes that differ to the shapes of the concave/convex patterns 40 inside the "first function regions" for the present invention are formed as dummy patterns may be used. In addition, although concave/convex patterns 40 of the same type as the concave/convex patterns 40 inside the first to fourth burst regions Ab1 to Ab4 are formed as dummy patterns inside the non-servo signal regions Axb on the magnetic disk 10 described above, the present invention is not limited to this. For example, it is possible to use a construction where the same type of concave/convex patterns 40 as the concave/convex patterns 40 inside the non-servo signal regions Ax are formed inside the non-servo signal regions Axb or a construction where concave/convex patterns 40 of arbitrary shapes that differ to the shapes of the concave/convex patterns 40 inside the "first function regions" for the present invention are formed as dummy patterns. In addition, although the servo patterns 40s and the data track patterns 40t are formed on only one surface of the glass substrate 11 of the magnetic disks 10 to 10c described above, the magnetic recording medium according to the present invention is not limited to such and it is possible to form the servo patterns 40s and the data track patterns 40t on both front and rear surfaces of the glass substrate 11.

Also, although the magnetic disks 10, 10a, 10b, and 10c where a concave/convex pattern composed of a plurality of convex parts 40a and a plurality of concave parts 40b is formed in each servo pattern region As has been described for the above embodiment, the present invention is not limited to such, and it is also possible to use a magnetic disk (not shown) where every protruding part around a plurality of concave parts 40b is made continuous to form a single convex part in a servo pattern region As.

Also, although the magnetic disks 10, 10a, 10b, and 10c where a concave/convex pattern composed of a plurality of convex parts 40a and a plurality of concave parts 40b is formed in each servo pattern region As has been described for the above embodiment, the present invention is not limited to such, and it is also possible to use a magnetic disk (not shown) where every recess around a plurality of convex parts 40a is made continuous to form a single concave part in a servo pattern region As.

What is claimed is:

1. A magnetic recording medium where a servo pattern is formed in a servo pattern region on at least one surface of a substrate by a concave/convex pattern including a convex part, at least protruding end part of which is formed of magnetic material, and a concave part, and the servo pattern region includes an address pattern region and a burst pattern region, wherein the convex part is formed in the servo pattern region so that a virtual inscribed circle with a largest diameter out of virtual inscribed circles on an open surface of the concave part formed in the burst pattern region is a virtual inscribed circle with a largest diameter out of virtual inscribed circles on an open surface of the concave part formed in the servo pattern region.

2. A magnetic recording medium according to claim 1, wherein a plurality of data recording tracks are formed in a data recording region on the at least one surface of the substrate by convex parts, at least protruding end parts of which are formed of the magnetic material, the data recording tracks being formed so that a length along a radial direction of open surfaces of concave parts between adjacent data recording tracks is equal to or smaller than the diameter of the virtual inscribed circle with the largest diameter out of the virtual inscribed circles on the open surface of the concave part formed in the burst pattern region.

3. A recording/reproducing apparatus comprising:
a magnetic recording medium according to claim 1; and
a control unit that carries out a tracking servo control process based on a predetermined signal read from the servo pattern region of the magnetic recording medium.

4. A magnetic recording medium where a servo pattern is formed in a servo pattern region on at least one surface of a substrate by a concave/convex pattern including a convex part, at least protruding end part of which is formed of magnetic material, and a concave part,
wherein the servo pattern region includes: a plurality of types of first function regions in which a control signal for tracking servo control is recorded by the concave/convex pattern during manufacturing; and a second function region where a concave/convex pattern of a different type to the concave/convex patterns of the first function regions is formed without the control signal being recorded, wherein an address pattern region and a burst pattern region are included as types in the plurality of types of first function regions, and the convex part is formed in the second function region so that a diameter of a virtual inscribed circle with a largest diameter out of virtual inscribed circles on an open surface of the concave part formed in the second function region is equal to or smaller than a diameter of a larger of a virtual inscribed circle with a largest diameter out of virtual inscribed circles on an open surface of the concave part formed in the address pattern region and a virtual inscribed circle with a largest diameter out of virtual inscribed circles on an open surface of the concave part formed in the burst pattern region.

5. A recording/reproducing apparatus comprising:
a magnetic recording medium according to claim 4; and
a control unit that carries out a tracking servo control process based on a predetermined signal read from the first function regions of the magnetic recording medium.

6. A stamper for manufacturing a magnetic recording medium on which is formed a concave/convex pattern including a convex part formed corresponding to the concave part in the concave/convex pattern of a magnetic recording medium according to claim 1 and a concave part formed corresponding to the convex part in the concave/convex pattern of the magnetic recording medium.

7. A stamper for manufacturing a magnetic recording medium on which is formed a concave/convex pattern including a convex part formed corresponding to the concave part in the concave/convex pattern of a magnetic recording medium according to claim 4 and a concave part formed corresponding to the convex part in the concave/convex pattern of the magnetic recording medium.

* * * * *